(12) United States Patent
Andersson

(10) Patent No.: US 12,098,747 B2
(45) Date of Patent: *Sep. 24, 2024

(54) LOW FRICTION SLIDE MEMBER

(71) Applicant: IKEA Supply AG, Pratteln (CH)

(72) Inventor: Benny Andersson, Älmhult (SE)

(73) Assignee: IKEA Supply AG, Pratteln (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,891

(22) Filed: Jan. 6, 2023

(65) Prior Publication Data

US 2023/0151851 A1     May 18, 2023

Related U.S. Application Data

(63) Continuation of application No. 15/757,541, filed as application No. PCT/SE2016/050835 on Sep. 7, 2016, now Pat. No. 11,578,754.

(30) Foreign Application Priority Data

Sep. 7, 2015   (SE) .................................... 1551138-9
Jul. 13, 2016  (SE) .................................... 1651049-7

(51) Int. Cl.
*F16C 29/00* (2006.01)
*B32B 15/08* (2006.01)
(Continued)

(52) U.S. Cl.
CPC ............ *F16C 29/005* (2013.01); *B32B 15/08* (2013.01); *C25D 11/04* (2013.01); *C25D 11/20* (2013.01); *E05D 15/0647* (2013.01); *E05D 15/0652* (2013.01); *F16C 29/048* (2013.01); *C09D 133/08* (2013.01); *E05Y 2201/684* (2013.01); *E05Y 2800/412* (2013.01); *E05Y 2800/45* (2013.01); *E05Y 2900/132* (2013.01); *E05Y 2900/20* (2013.01); *F16C 2223/30* (2013.01);
(Continued)

(58) Field of Classification Search
None
See application file for complete search history.

(56) References Cited

U.S. PATENT DOCUMENTS 1,071,006 A   8/1913  Little
2,441,721 A   5/1948  Schroeder
(Continued)

FOREIGN PATENT DOCUMENTS

CA   2 437 147 A1   2/2005
CH     334 983 A   12/1958
(Continued)

OTHER PUBLICATIONS

Stepek and Daoust—Additives for Plastics—Springer—1983 (Year: 1983).*

(Continued)

*Primary Examiner* — John Vincent Lawler
(74) *Attorney, Agent, or Firm* — Renner, Otto, Boisselle & Sklar, LLP

(57) ABSTRACT

A slide member having a slide surface coated with a lacquer comprising a resin. The lacquer is in turn at least partly coated with a lipophilic composition coating. The lipophilic composition coating provides a slide layer on the slide member with low friction.

21 Claims, 7 Drawing Sheets

(51) Int. Cl.
*C09D 133/08* (2006.01)
*C25D 11/04* (2006.01)
*C25D 11/20* (2006.01)
*E05D 15/06* (2006.01)
*F16C 29/04* (2006.01)

(52) U.S. Cl.
CPC ...... *F16C 2223/70* (2013.01); *F16C 2314/70* (2013.01)

(56) References Cited

U.S. PATENT DOCUMENTS

| | | | |
|---|---|---|---|
| 2,627,447 | A | 2/1953 | Cook |
| 2,720,316 | A | 10/1955 | Glascott |
| 2,743,971 | A | 5/1956 | Kramcsak, Jr. |
| 3,139,313 | A | 6/1964 | Rule |
| 3,221,677 | A | 12/1965 | Kerr |
| 3,622,473 | A * | 11/1971 | Ohta ............ C25D 11/20 204/488 |
| 3,755,093 | A * | 8/1973 | Suematsu ........... C25D 13/00 525/380 |
| 3,760,744 | A | 9/1973 | Cruckshank |
| 3,916,802 | A | 11/1975 | Virtue |
| 4,008,589 | A | 2/1977 | Harrell |
| 4,011,696 | A | 3/1977 | Klein |
| 4,036,369 | A | 7/1977 | Eisenberg |
| 4,138,176 | A * | 2/1979 | Cowdroy ........... A47B 88/483 384/22 |
| 4,286,525 | A | 9/1981 | Willmore |
| 4,297,952 | A | 11/1981 | Zagaroli |
| 4,371,446 | A * | 2/1983 | Kinoshita ........... C10M 105/56 508/144 |
| 4,500,146 | A | 2/1985 | Peterson |
| 4,637,081 | A | 1/1987 | Clark |
| 4,653,139 | A | 3/1987 | Vollberg et al. |
| 4,713,949 | A | 12/1987 | Wilcox |
| 5,064,547 | A | 11/1991 | Rubin |
| 5,085,524 | A | 2/1992 | Reiss |
| 5,101,524 | A | 4/1992 | Brandschain |
| 5,171,622 | A | 12/1992 | Wegner |
| 5,263,384 | A | 11/1993 | Suzuki |
| 5,290,058 | A | 3/1994 | Adams et al. |
| 5,325,732 | A | 7/1994 | Vogel |
| 5,549,377 | A | 8/1996 | Krivec |
| 5,735,610 | A | 4/1998 | Mark et al. |
| 5,981,448 | A | 11/1999 | Matsui et al. |
| 6,004,909 | A | 12/1999 | Lindman |
| 6,225,404 | B1 | 5/2001 | Sorensen et al. |
| 6,427,286 | B1 | 8/2002 | Erskine |
| 6,463,625 | B2 | 10/2002 | Mittag |
| 6,520,092 | B2 | 2/2003 | Marshall |
| 6,822,014 | B2 | 11/2004 | Katou |
| 6,854,402 | B2 | 2/2005 | Dubarry |
| 6,855,676 | B2 | 2/2005 | Li et al. |
| 6,877,826 | B2 | 4/2005 | Wood |
| 7,398,737 | B1 | 7/2008 | Martellaro |
| 7,653,966 | B2 | 2/2010 | Quinn |
| 7,780,254 | B2 | 8/2010 | Wang |
| 7,987,799 | B2 | 8/2011 | Lange |
| 8,418,318 | B2 | 4/2013 | Scharf et al. |
| 10,077,934 | B1 | 9/2018 | Dizon |
| 10,441,069 | B2 | 10/2019 | Andersson |
| 10,844,906 | B2 | 11/2020 | Andersson |
| 2003/0013615 | A1 | 1/2003 | Levy |
| 2003/0176302 | A1 | 9/2003 | Li et al. |
| 2003/0213698 | A1 | 11/2003 | Kawagoshi et al. |
| 2004/0096129 | A1 | 5/2004 | Schmalzhofer |
| 2004/0098831 | A1 | 5/2004 | Elmer |
| 2007/0261198 | A1 | 11/2007 | Vogler |
| 2008/0092450 | A1 | 4/2008 | Balduck et al. |
| 2008/0125338 | A1 | 5/2008 | Corbett et al. |
| 2008/0159671 | A1 | 7/2008 | Leonardelli |
| 2009/0108667 | A1 | 4/2009 | Clark et al. |
| 2011/0177987 | A1 | 7/2011 | Lenting et al. |
| 2012/0240350 | A1 | 9/2012 | Natu et al. |
| 2014/0157677 | A1 | 6/2014 | Walawender et al. |
| 2014/0208654 | A1 | 7/2014 | Anderson |
| 2014/0255656 | A1 | 9/2014 | Suzuki et al. |
| 2015/0361274 | A1 | 12/2015 | Domes et al. |
| 2016/0106221 | A1 | 4/2016 | Gardner |
| 2016/0319211 | A1 | 11/2016 | Barth et al. |
| 2016/0340951 | A1 | 11/2016 | Andren et al. |
| 2019/0353202 | A1 | 11/2019 | Wang |

FOREIGN PATENT DOCUMENTS

| | | | | |
|---|---|---|---|---|
| CN | 1090593 | A | 8/1994 | |
| CN | 1223675 | A | 7/1997 | |
| CN | 2481814 | Y | 3/2002 | |
| CN | 1385482 | A | 12/2002 | |
| CN | 2542785 | Y | 4/2003 | |
| CN | 101035959 | A | 9/2007 | |
| CN | 201079158 | Y | 7/2008 | |
| CN | 201190490 | U | 2/2009 | |
| CN | 201230725 | U | 5/2009 | |
| CN | 201491997 | U | 6/2010 | |
| CN | 102307499 | A | 1/2012 | |
| CN | 202128137 | U | 2/2012 | |
| CN | 202436824 | U | 9/2012 | |
| CN | 103555177 | A | 2/2014 | |
| CN | 103573075 | A | 2/2014 | |
| CN | 103867062 | A | 6/2014 | |
| CN | 104154118 | A | 11/2014 | |
| DE | 1112266 | B | 8/1961 | |
| DE | 3613313 | A1 | 10/1987 | |
| DE | 29611949 | U1 | 9/1996 | |
| DE | 29813478 | U1 | 11/1998 | |
| DE | 19924642 | C2 | 5/1999 | |
| DE | 20111930 | U1 | 10/2001 | |
| DE | 10 2011 053 946 | A1 | 3/2013 | |
| EP | 985793 | A2 | 3/2000 | |
| EP | 1153560 | A2 | 11/2001 | |
| EP | 1568299 | B1 | 8/2005 | |
| EP | 2957784 | A1 | 12/2015 | |
| FR | 1467583 | A | 1/1967 | |
| GB | 1126855 | A | 9/1968 | |
| GB | 1383645 | | 2/1975 | |
| GB | 1415100 | A | 11/1975 | |
| GB | 2 386 929 | A | 10/2003 | |
| JP | 57173666 | A | 10/1982 | |
| JP | H05/76447 | * | 3/1993 | ............ A47H 1/04 |
| JP | H0576447 | A | 3/1993 | |
| JP | H06136304 | A | 5/1994 | |
| JP | 2003268194 | A * | 9/2003 | |
| JP | 2005042304 | A | 2/2005 | |
| JP | 2006062328 | A * | 3/2006 | |
| SU | 1690664 | A1 | 11/1991 | |
| WO | 9424912 | A1 | 11/1994 | |
| WO | WO 1996/04451 | * | 2/1996 | ............ E06B 3/42 |
| WO | 1999047824 | A1 | 9/1999 | |
| WO | WO 1999/47824 | * | 9/1999 | ............ F16C 29/02 |
| WO | 2006022669 | A1 | 3/2006 | |
| WO | WO-2015051892 | A1 * | 4/2015 | ............ F25D 23/087 |
| WO | 2017042201 | A1 | 3/2017 | |
| WO | 2017042203 | A1 | 3/2017 | |
| WO | 2017042228 | A1 | 3/2017 | |
| WO | 2017044034 | A1 | 3/2017 | |

OTHER PUBLICATIONS

Nakajima—JP H05-76447 A—Euro D#1—MT—low friction aluminum rail—1993 (Year: 1993).*
Oka—JP 2003-268194 A—Euro D#4—MT—resin and sash roller—2003 (Year: 2003).*
Hirai—JP 2006-062328 A—Euro D#3—MT—multiple layer sliding member—2006 (Year: 2006).*
Hussein—Enhancement of wear resistance & microhardness of aluminum alloy—Sci.World.J.—2014 (Year: 2014).*
Loehle—ISR D#5—Mixed Lubrication With C18 Fatty Acids—2014 (Year: 2014).*
Ruckert—WO 2015-051892 A1—Euro D#2—MT—alkyl groups coated on slide—Apr. 2015 (Year: 2016).*

(56) References Cited

OTHER PUBLICATIONS

Davis—chemical structure of lubricating oils—Ind. Eng.Chem.—1930 (Year: 1930).*
Campen—lubrication with fatty acids—PhD Thesis—2012 (Year: 2012).*
ChemPoint—Duomeen® TDO, paste, Nouryon—Jan. 6, 2024 (Year: 2024).*
Teaching Books of East China Central China Higher Forestry College (School), "Wood Processing Materials (First draft)", Edited by the Textbook Review Committee of the East China Central China Higher Forestry College {School}, p. 179, China Forestry Publishing House, published on Sep. 1959.
Roleira, F M F et al, Lipophilic phenolic antioxidants: Correlation between antioxidant profile, partition coefficients and redox properties, Bioorganic & Medicinal Chemistry, Elsevier, ML, vol. 18, No. 16, Aug. 15, earn, pp. 5816-5825.
MJ. Furey et al., The Effect of Lubriccant Viscosity on Metallic Contact and Friction in a Sliding System, vol. 5, No. Jan. 1, 1962, pp. 149-159, XP055745398.
Anonymous, Standard Test Method for Total Iodine Value of Drying Oils and Their Derivatives (D 1541-97), Withdrawn, Jan. 1, 1997, pp. 1-4, XP055745437, retrieved from the internet: www.astm.org on Oct. 30, 2020.
Anonymous, Regulation (EC) No. 1935/2004 of the European Parliament and of the Council of Oct. 27, 2004 on materials and articles intended to come into contact with food and repealing Directives 80/590/EEC and 89/109/EEC, Official Journal of the European Union, Nov. 13, 2004, pp. 1-14, XP055745458.
Anonymous, Liquid Petroleum or "Russian Mineral Oil", Journal of Pharmaceutical Sciences, vo. 3, No. 7, Jul. 1, 1914, pp. 1013-1018, XP055745484, ISSN: 0898-140X, DOI: 10.1002/jps.3080030718.
Nakajima—JP H05-76447 A—Euro 0#1—MT—low friction aluminum rail—1993 (Year: 1993).
Hirai—JP 2006-062328 A—Euro 0#3—MT—multiple layer sliding member—2006 (Year: 2006).
Loehle—ISR 0#5—Mixed Lubrication With C18 Fatty Acids—2014 (Year: 2014).
Ruckert—WO 2015-051892 A 1—Euro 0#2—MT—alkyl groups coated on slide—Apr. 2015 (Year: 2015).
Table of aluminum hardnessess—Nov. 29, 2019 (Year: 2019).
Loehle et al. "Mixed Lubrication with C18 Fatty Acids: Effect of Unsaturation", Tribology Letters, 2014, vol. 53, pp. 319-328.
Greenlaw, "I use coconut oil instead of a spray lubricant as much as possible, especially near food", Pinterest 111 , 'Nov. 1, 2014 (Nov. 1, 2014)' XP055315462, Retrieved from the Internet: URL:https:jnl.pinterest.com/pin/395331673512857041/[retrieved on 20:1.6-01].
International Search Report and Written Opinion for copending International Application No. PCT/EP2016/071065 mailed Nov. 14, 2011.
International Preliminary Report on Patentability copending International Application No. PCT/EP2016/071065 mailed Oct. 12, 2017.
International Search Report and Written Opinion for copending International Application No. PCT/EP2016/071104 mailed Nov. 16, 2011.
International Preliminary Report on Patentability copending International Application No. PCT/EP2016/071104 mailed Oct. 12, 2017.
International Search Report and Written Opinion for copending International Application No. PCT/SE2016/050837 mailed Nov. 23, 2016.
International Preliminary Report on Patentability copending International Application No. PCT/SE2016/050837 mailed Oct. 13, 2017.
International Search Report and Written Opinion for corresponding International Application No. PCT/SE2016/050835 mailed Nov. 23, 2016.
International Search Report and Written Opinion for copending International Application No. PCT/EP2016/071059 mailed Dec. 5, 2016.
Extended European Search Report dated Nov. 27, 2023, for European Patent Application No. 23184719.5.

* cited by examiner

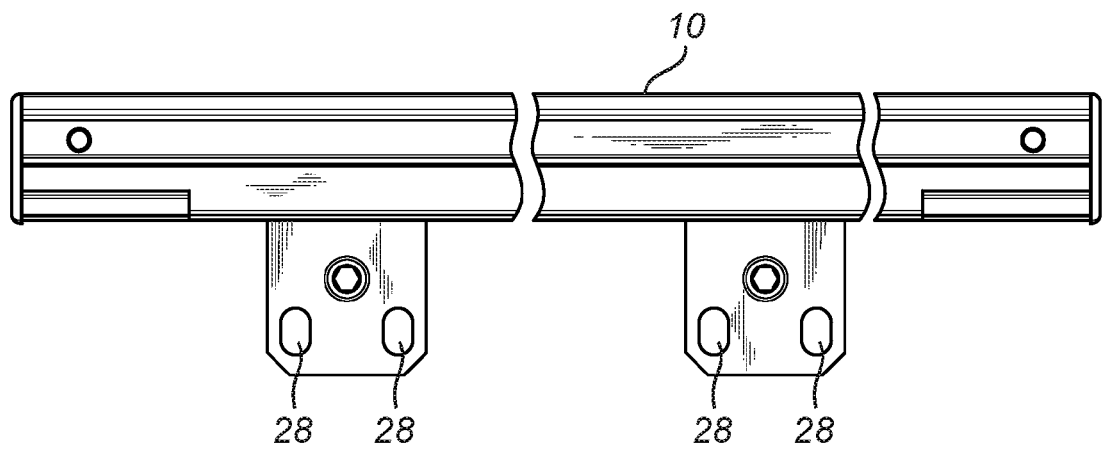
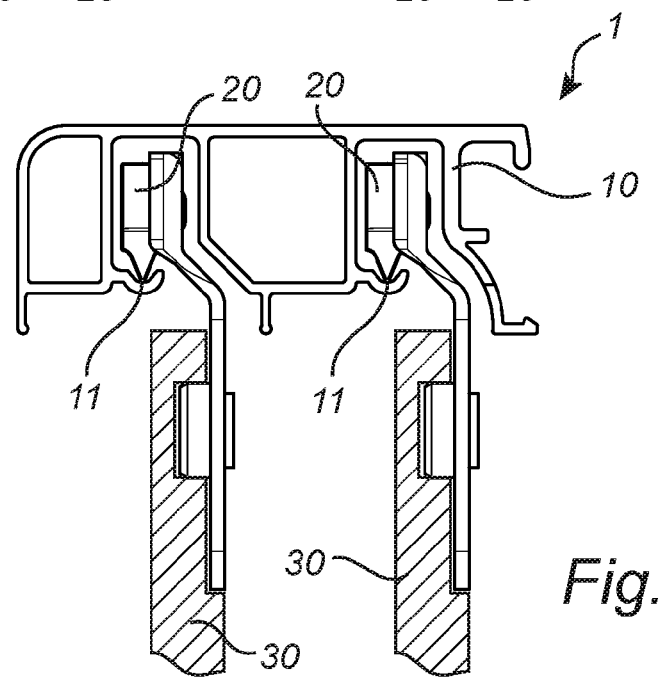
Fig. 3
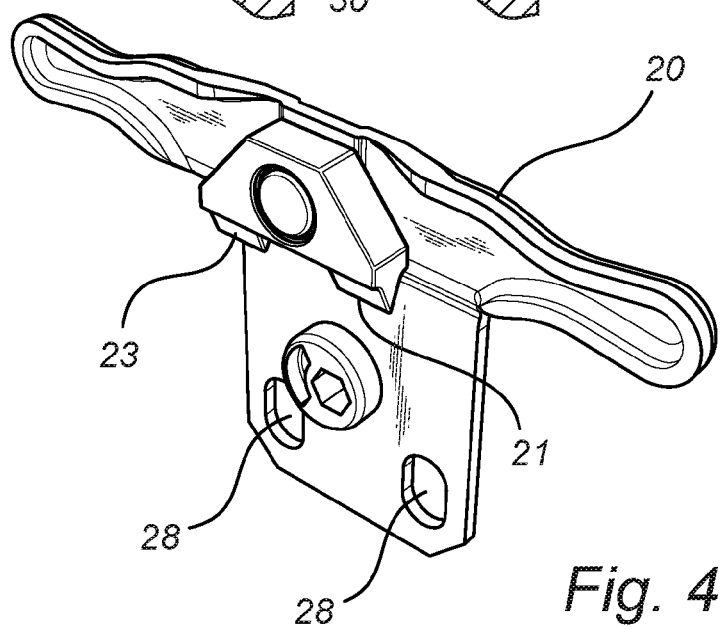
Fig. 4

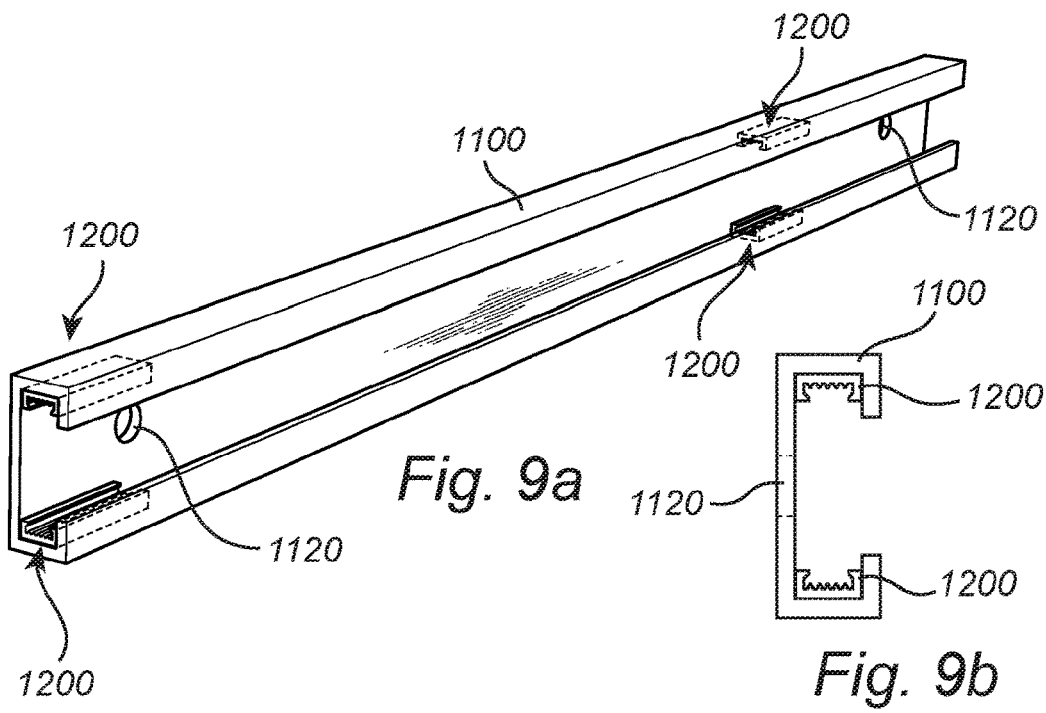
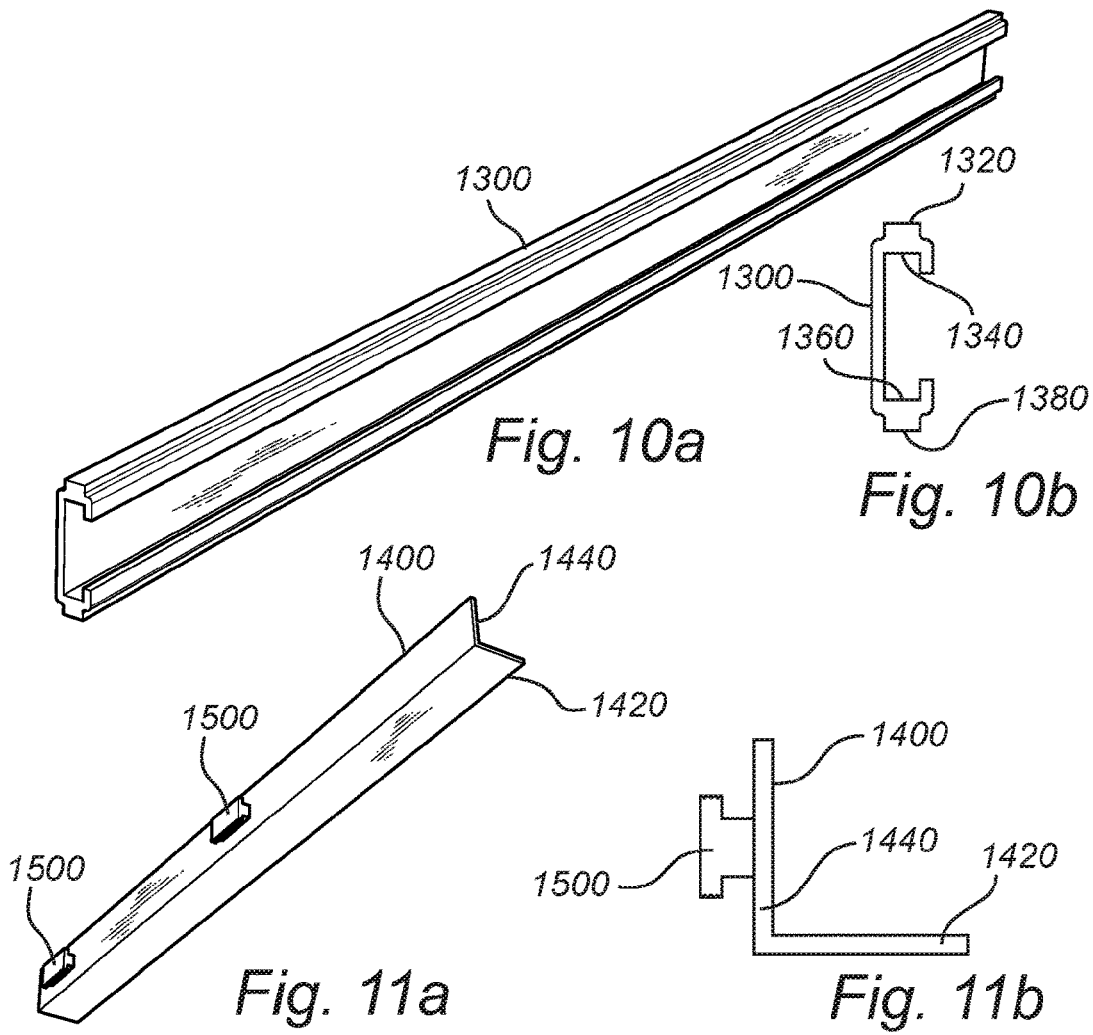

LOW FRICTION SLIDE MEMBER

This application is a continuation of U.S. application Ser. No. 15/757,541 filed Mar. 5, 2018, which is a national phase of International Application No. PCT/SE2016/050835 filed Sep. 7, 2016, and claims priority to Swedish Application No. 1551138-9 filed on Sep. 7, 2015 and Swedish Application No. 1651049-7 filed on Jul. 13, 2016, which are incorporated herein by reference.

FIELD OF THE INVENTION

The present invention relates to a slide member, e.g. a slide bar or a sliding part, having a sliding layer with low friction. Further, the invention relates to a sliding system comprising such a slide member. Such sliding systems may for example be used in sliding door arrangements, extendable tables, kits for hanging curtains, and sliding drawer arrangements.

BACKGROUND

Wardrobes having sliding doors are well-known in the art (cf. e.g. DE 298 13 478). Typically, the doors are arranged with supportive ball bearings, e.g. wheels rolling over a rail, at the upper end of the door and steering means, e.g. pins, at the lower. Ball bearings are working well, but suffer from being somewhat dust sensitive. Further, the start-stop resistance is very low if the doors are to be easily moveable; an inherent feature of ball bearings. At the end-positions, this may be partly overcome by providing resting end-positions provided with e.g. heads or recesses, for the wheels. However, this would not overcome the low start-stop resistance at intermediate positions.

Sliding kitchen doors, being less heavy than wardrobe sliding doors, are typically not provided with ball bearings, but are mounted standing in a sliding groove, i.e. a linear plain bearing. For lighter doors this may work well, though the sliding resistance may be fairly high; especially at start. However, for heavier doors, e.g. wardrobe sliding doors, linear plain bearings typically provide too high sliding resistance for practical use; especially at start. Further, such linear plain bearings are sensitive to dust contamination affecting the sliding resistance very negatively.

Further, also chests of drawer may be provided with linear plain bearings, such as a simple arrangement with a groove in the drawer rack receiving a strip arranged on the drawer. Chests of drawers may also be provided with more sophisticated linear plain bearings (cf. e.g. DE 10 2011 053 946). Still, drawers getting slightly tilted often get stuck in the chest.

Given its simplicity, it would be desired to provide a slide member with very low sliding friction. Such a slide member may find use e.g. with wardrobe sliding doors. Further, such a slide member may find use also in other applications, such as extendable tables, kits for hanging curtains, drawers of chests of drawers, etc.

SUMMARY

Consequently, the present invention seeks to mitigate, alleviate, eliminate or circumvent one or more of the above identified deficiencies and disadvantages in the art singly or in any combination by providing a slide member, e.g. a slide bar or a sliding part, having a slide surface coated with a lacquer comprising a resin. The lacquer is in turn is at least partly coated with a lipophilic composition coating to provide a slide layer with lowered friction. This provides for a low friction slide member with efficient function in many applications, including furniture applications such as sliding doors, drawers, tables, extendable bed frames and extendable beds, etc.

According to one embodiment at least the slide surface of the slide member may be an aluminum surface. This provides for an efficient support for the lacquer coated on the slide surface. According to one embodiment the aluminum surface has an anodized oxide surface layer onto which the lacquer is applied. The anodized surface is hard and provides for good adhesion of the lacquer applied thereto. The slide member may be an aluminum member, e.g. aluminum profile, preferably having an anodized oxide surface layer, onto which the lacquer is applied. As an example, the slide member may be an aluminum profile having been electrophoretically, preferably anaphoretically, coated with an acrylic resin and subsequently heat cured to form the lacquer coated on the slide surface. Preferably, the aluminum profile has an anodized oxide surface layer onto which the lacquer is applied. The Honny process or one of its derivatives may be used to obtain such anodized, lacquered surfaces. Whereas the thickness of the anodized oxide surface layer preferably is at least 5 micrometers, the thickness of the lacquer coated on the slide bar may preferably be 100 micrometers or less. The lipophilic composition coating typically comprises compounds comprising C6 to C40, such as C8 to C30, non-aromatic hydrocarbyl groups, such as alkenyl groups and/or alkyl groups, e.g. alkyl groups.

According to another embodiment the slide surface of the slide member is made from steel, onto which the lacquer is applied. Steel is a generally strong, hard and comparably cheap material that can be used as a starting material for the slide member. Steel surfaces may be lacquered by electrocoating or autodeposition to provide a lacquer layer with uniform thickness.

According to a further aspect there is provided a sliding system. The system comprises the slide member according any of the above embodiments and having the form of a linear slide bar, and at least one sliding member. The interface between the slide layer of the slide bar and the sliding member forms a linear plain bearing to allow for linear movement of the sliding member along the longitudinal axis of the linear slide bar.

According to one embodiment the part of said sliding member to slide over the slide layer may be configured as a blade extending in the sliding direction. Further, the slide layer may be present at a track, such as in a groove or on a ridge, extending along the longitudinal axis of the slide bar. The sliding member comprises at least one individual contact point in contact with the slide bar at the interface between the slide bar and the sliding member. The contact area of each individual contact point may be less than 3 $mm^2$. Further, the contact pressure in the at least one contact point may be at least 4 $N/mm^2$.

According to a further aspect there is provided an alternative sliding system. The alternative sliding system comprises a sliding part, being a sliding member coated with a lacquer comprising a resin and also provided with a lipophilic composition thereon, the sliding part being arranged to slide along a linear slide profile to form a linear plain bearing, the sliding system further comprising at least one linear slide profile. The interface between the slide layer of the slide part and the linear slide profile forms a linear plain bearing to allow for linear movement of the slide part along the longitudinal axis of the linear slide profile. The linear slide profile may be plastic profile provided with at least one ridge extending along the longitudinal axis of the slide profile. The sliding system is arranged in a manner such that the slide layer of the slide part engages with the ridge in sliding over the linear slide profile. According to an embodiment, the plastic profile is provided with a sliding channel for the sliding part to slide in. As an example, the plastic profile may be U-shaped. Further, at least one surface of the channel, e.g. an interior surface of a U-shaped profile, may be provided with a ridge extending along the longitudinal axis of the channel.

According to a further aspect there is provided for use of lipophilic composition as an irreversibly bound lubricant for a slide surface of a slide member. The slide surface is coated with a lacquer comprising a resin.

According to a further aspect there is provided a method for providing the slide member. The method comprises the steps of:
  providing a member having a slide surface coated with a lacquer comprising a resin; and
  coating at least part of the lacquer comprising a resin with a lipophilic composition to provide a slide member.

Further advantageous features of the invention are elaborated in embodiments disclosed herein. In addition, advantageous features of the invention are defined in the dependent claims.

BRIEF DESCRIPTION OF THE DRAWINGS

The above and other aspects, features and advantages of which the invention is capable of will be apparent and elucidated from the following description of the present invention, reference being made to the accompanying drawings, in which

FIG. 3 depicts a sliding system according to a second embodiment and a cross section thereof;

FIG. 4 depicts a sliding member of the second embodiment in FIG. 3;

FIG. 9a is an isometric view of a first part of a sliding system according to an embodiment for use with e.g. an extendable bed or an extendable bed frame;

FIG. 9b is a cross-sectional view of the part shown in FIG. 9a;

FIG. 10a is an isometric view of a second part of the sliding system according to the same embodiment;

FIG. 10b is a cross-sectional view of the part shown in FIG. 10a;

FIG. 11a is an isometric view of a third part of the sliding system according to the same embodiment;

FIG. 11b is a cross-sectional view of the part shown in FIG. 11a; and

DETAILED EMBODIMENTS

Figure 1:
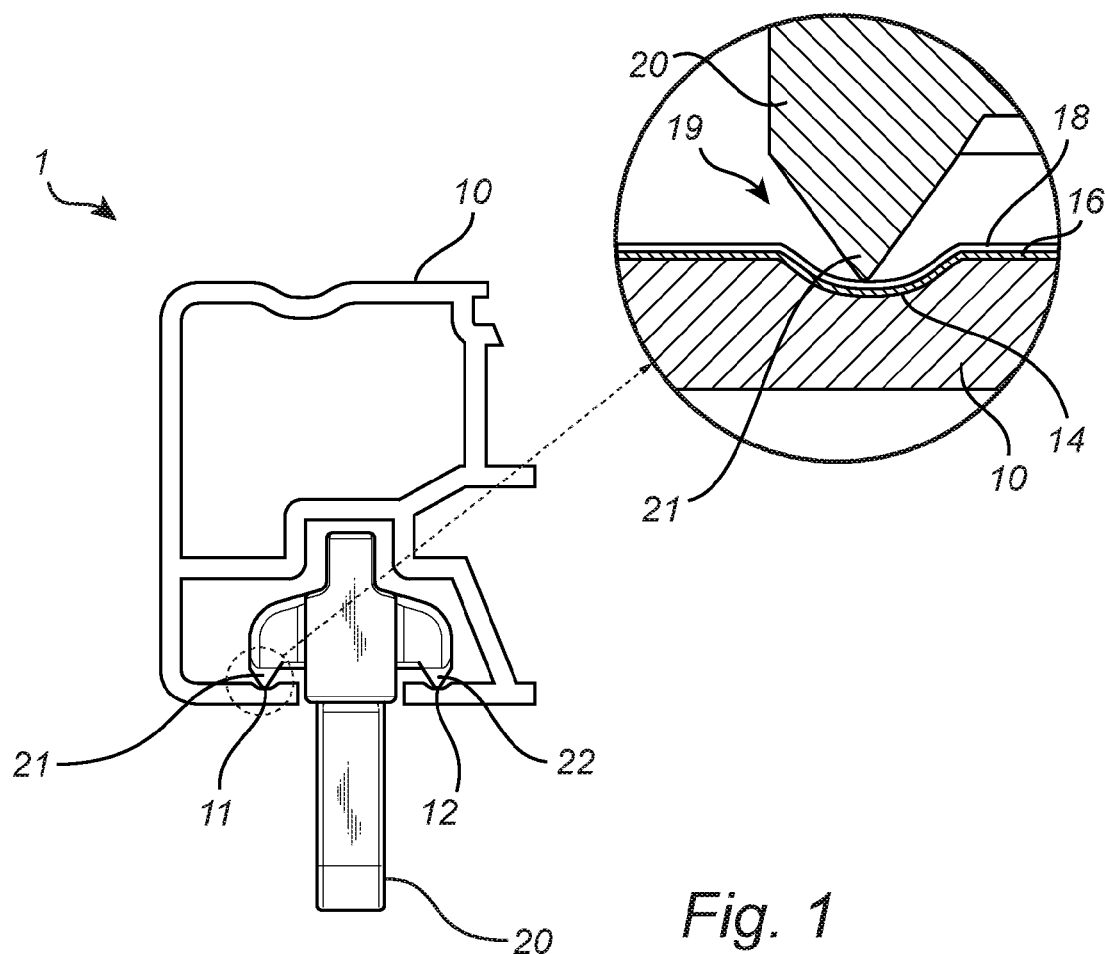
FIG. 1 depicts a cross section of a sliding system according to a first embodiment.

The present inventors have surprisingly found that coating a surface lacquered with a resin, for example an acrylic resin, with a lipophilic composition, such as for example sebum (natural or artificial), coconut oil, or liquid paraffin, provides a slide layer with extremely low friction (sliding resistance). The application of the lipophilic composition reduces the dynamic friction with as much as 75%. Further, and even more surprisingly, the effect is not temporarily, but seemingly permanent or at least long-lasting. The need to replenish the lubricant may hence be dispensed with.

In experiments employing aluminum profiles having been anaphoretically coated with an acrylic resin subsequently heat cured to form a lacquer (cf. the Honny process, initially disclosed in GB 1,126,855), wherein the lacquer of the aluminum profiles was coated with sebum, the friction remained nearly the same after more than 70,000 test cycles of a sliding door being reciprocated along the profile. So many cycles by far exceed the expected number on lifetime cycles. Further, washing the coated aluminum profile with water/detergent, ethanol, and/or iso-propanol didn't affect the friction. Without being bond to any theory, it seems that the sebum coating provides an irreversibly bound lubricant coating on top of the lacquer comprising the acrylic resin. Further, the lacquer seems to be important in providing low friction.

According to an embodiment there is thus provided a slide member, such as a slide bar 10, having a slide surface 14 coated with a lacquer comprising a resin 16. The lacquer is in turn at least partly coated with a lipophilic composition coating 18 to provide a slide layer 19 with lowered friction. By coating the lacquer, the sliding friction is not just temporarily lowered, but long term low sliding friction is obtained. As already explained the lubricating coating may be permanent, dispensing with the need to replenish the lubricating coating. Further, very low amounts of the lipophilic composition are needed to provide lowered friction. Thus, contamination of the lubricating coating does not pose any pronounced problem, as the coating, due to the very low amount present, does not have substantial adhesive properties. This is in contrast to the normal use of lubricants in plain bearings. Further, exposure to contaminations, e.g. dust etc., has been shown not to affect the lowered friction. Neither is the lubricating coating sensitive to washing. Wiping the slide member, e.g. the slide bar 10, with a dry and/or wet cloth, does not affect the lowered friction. These properties make the slide member, e.g. the slide bar 10, very useful for use in systems for sliding wardrobe doors, extendable tables, drawers of chests of drawers, hanging curtains, and similar applications.

Figure 2:
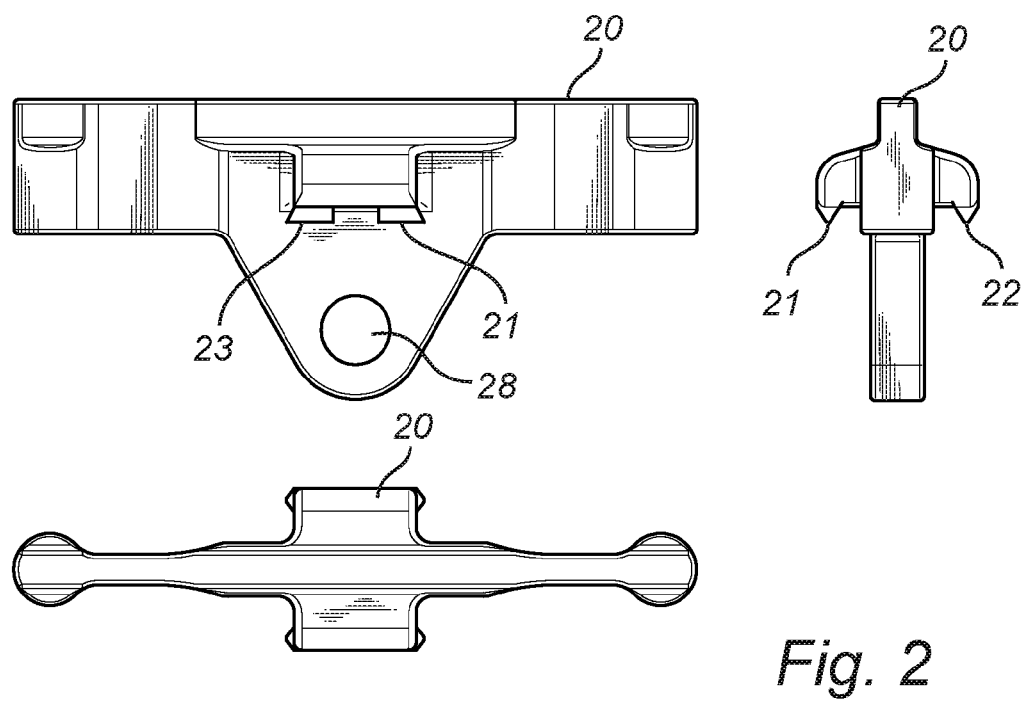
FIG. 2 depicts cross sections of the sliding member in FIG. 1.

According to an embodiment the slide member is a slide bar 10 as depicted in FIGS. 1 to 3.

Such a low amount of the lipophilic composition coating 18 is needed, that the lipophilic composition may be applied to a sliding member 20 rather than to the slide bar 10. In sliding over the slide bar 10, the lipophilic composition will be transferred to the slide bar 10 to provide a lipophilic composition coating 18. Hence, the lipophilic composition coating 18 could be applied to the slide bar 10, to the sliding member 20, or both.

Figure 5A:
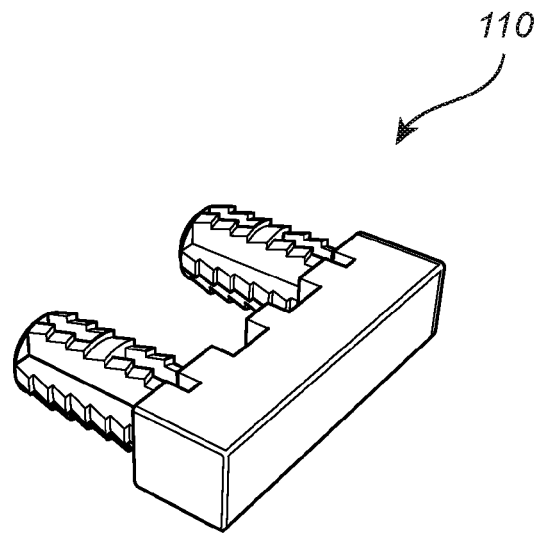
FIGS. 5a-c depict a sliding part and a linear slide profile according to a third embodiment, a sliding system comprising the sliding part and the slide profile and a cross section thereof.
Figure 5B:
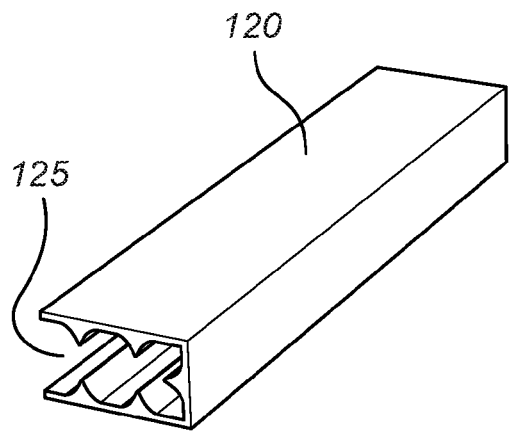
Figure 5C:
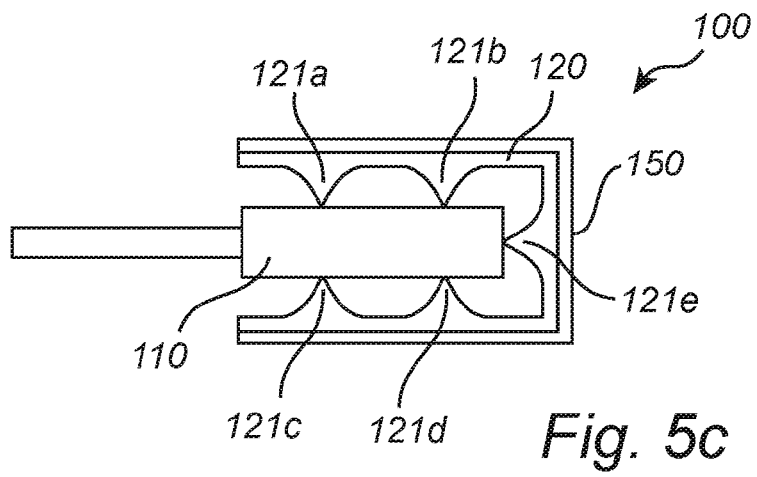

According to the alternative embodiment depicted in FIGS. 5a-c, the slide member is a sliding part 110 whose slide layer, having a similar composition as the slide layer 19 described hereinbefore with reference to FIG. 1, is arranged to slide along the longitudinal axis of a linear slide profile 120, e.g. a plastic profile, to form a linear plain bearing. At least the slide surface (similar to the slide surface 14 of FIG. 1) of the sliding part 110 may, according to one embodiment, be an aluminum surface, preferably having an anodized oxide surface layer, onto which the lacquer is applied. The thickness of anodized oxide surface layer is preferably at least 5 micrometers, more preferably at least 10 micrometers. Further, the thickness of the anodized layer, if present, may be less than 250 micrometers, such as less than 100 micrometers or less than 50 micrometers. A sliding part according to such an alternative embodiment, an example of which is described in FIGS. 5*a*-*c*, is less preferred for use in supporting heavy sliding doors. It is however considered to be well suited for use in sliding systems for e.g. extendable tables, drawers, etc.

While the slide member, e.g. a slide bar 10, preferably is an aluminum member, e.g. a linear aluminum profile, with an aluminum oxide layer, also other materials coated with a lacquer comprising a resin may be considered. In order to allow for long term use and to carry loads, the slide member is typically made from a hard material, such as metal or glass. Especially the surface of the slide member should preferably be hard. The Vickers hardness of the material from which the slide member is made, may be at least 50 MPa, preferably at least 100 MPa, more preferably at least 150 MPa, and most preferably at least 300 MPa. According to an embodiment, the slide member is a metal member, such as an aluminum member or a steel member. In such embodiment, the member is made of a metal. While it is preferred if an aluminum member has an oxide layer, also a raw, i.e. not oxidized, lacquered aluminum member may be used. It is however preferred if the surface of the aluminum member is oxidized to provide the aluminum member with a hard oxide surface layer.

The slide member, e.g. a slide bar 10, may be an aluminum member. Further, the surface of the aluminum member coated with the lacquer may be an aluminum oxide layer. The thickness of such oxide layer may be at least 5 micrometers, more preferably at least 10 micrometers. Further, the thickness of the oxide layer may be less than 250 micrometers, such as less than 100 micrometers or less than 50 micrometers. As known in the art, the durability and hardness of the surface of aluminum profiles may be improved by oxidation due to the properties of aluminum oxide. The oxide layer initially provided by anodically oxidation is porous. While the pores may be closed by steam treatment, sealing via anaphoretically coating with an acrylic resin subsequently heat cured to form the lacquer, is even more effective in sealing the porous aluminum oxide layer: This method, firstly disclosed by Honny Chemicals Co. Ltd. (cf. GB 1,126,855), is often referred to as the Honny process.

Further, compared to plastic slide bars, a hard, stiff bar, such as aluminum or steel bar, may accept far more heavy loads and still provide low friction. The present slide bar 10 may thus also be used for sliding drawers.

In addition, it has been found that a relatively high contact pressure in the contact between the slide bar 10 and the sliding member 20 reduces the friction. For this reason as well it is beneficial to make the slide bar 10 from a hard material, such as aluminum or steel, since such materials can accept higher contact pressures, thereby reducing friction.

According to an embodiment, the low friction slide bar 10 is a linear aluminum profile. Preferably, the linear aluminum profile is oxidized (e.g. anodized) in order to increase the hardness of the surface. The profile is typically anaphoretically coated with an acrylic resin subsequently heat cured, thereby providing a linear slide bar 10 having a lacquered slide surface 14. The aluminum profile may be anodized to obtain an anodized layer thickness of at least 5 micrometers, more preferably at least 10 micrometers, prior to application of the resin of the lacquer. Further, thickness of the anodized layer may be less than 250 micrometers, such as less than 100 micrometers or less than 50 micrometers. Such profiles may be obtained via the Honny process (cf. above) or one of its derivatives. Typically, the Honny process is used to provide white, glossy profiles. However, neither the Honny process nor the present embodiments are limited to white profiles. The preferable feature is that the lacquer is suitable for being coated with the lipophilic composition coating 18.

As known in the art, various resins, e.g. thermosetting resins, may be used to lacquer aluminum bars and other bars, i.e. to form a lacquer on aluminum bars and other bars. Further, thermosetting resins may also be used to lacquer other metal members, e.g. a sliding member made of steel. The lacquer comprises a resin. As known to the skilled person, a lacquer is a hard, thin coating. The resin of the lacquer may for this application preferably comprise polar groups, such as hydroxyl groups, carboxylic acid groups, amide groups, cyano groups (nitrile groups), halide groups, sulfide groups, carbamate group, aldehyde groups, and/or ketone groups. Further may the resin of the lacquer be a thermosetting resin.

Examples of resins for lacquering metal comprise acrylic resins and polyurethane resins. According to an embodiment, the resin is an acrylic resin, such as an acrylate resin, an acrylamide resin, a methacrylate resin, or a methyl methacrylate resin, and mixtures thereof. According to another embodiment, the resin is a polyurethane resin. The acrylic resin may be a thermosetting resin.

According to another embodiment, the resin of the lacquer is selected from the group consisting of: acrylic resins, acrylate resins, acrylamide resins, methacrylate resins, methyl methacrylate resins, acrylonitrile resins, styrene-acrylonitrile resins, acrylonitrile styrene acrylate resins, reaction products or a mechanical mixture of alkyd resin and water-soluble melamine resin, reaction products or a mechanical mixture of a vinyl-modified unsaturated alkyd resin and a water-soluble melamine resin, and polymers and mixtures of one or several of these resins.

Further, the thermosetting resin may the reaction product or a mechanical mixture of an alkyd resin and water-soluble melamine resin, or of a vinyl-modified unsaturated alkyd resin and a water-soluble melamine resin, the water-soluble melamine resin being obtained from hexamethylol melamine hexaalkylether. Vinyl modified unsaturated alkyd resins may be made by polymerization of a vinyl monomer with an alkyd resin composed of an unsaturated oil or fatty acid. As known to the skilled person, the term "vinyl monomer" relates to a monomer having a vinyl group ($-CH=CH_2$) in the molecule, such as an acrylic ester, for example methyl acrylate and ethyl acrylate, a methacrylic ester, for example methyl methacrylate and hydroxyethyl methacrylate, an unsaturated, organic acid, for example acrylic acid and methacrylic acid, and styrene.

Processes for obtaining thermosetting acrylic resins are well-known to the skilled person. As an example, they may be obtained by heating and stirring a mixture consisting of organic solvents, such as methanol, ethylene glycol, monobutyl ether, and/or cyclohexanone, unsaturated organic acids, such as acrylic acid, methacrylic acid, and/or maleic anhydride, a cross-linking vinyl monomer (as defined above), such as methylol-acrylamide and/or methylol methacrylamide, a polymerizable vinyl monomer, such as styrene and/or acrylic acid ester, polymerization catalysts, such as benzoyl peroxides and/or lauroyl peroxides, and polymerization regulators, such as dodecyl mercaptan and/or carbon tetrachloride, to carry out polymerization, thereafter neutralizing the product with, for example, an aqueous solution of ammonia and/or triethylamine to make the resin soluble in water. Further, as known to the skilled person, thermosetting resins composed of alkyd resins and water-soluble melamine resin may be obtained from hexamethylol melamine hexaalkyl ether, may be obtained by mixing a water-soluble melamine resin at a temperature of from room temperature to 100° C. with an alkyd resin modified with a fatty acid, the alkyd resin having an acid value of from 10 to 80 and being obtained by heating a mixture consisting of (1) a saturated or unsaturated aliphatic acid, (2) ethylene glycol, glycerol, polyethylene glycol, other polyhydric alcohol or an epoxide, (3) adipic acid, sebacic acid, maleic anhydride or other polybasic acid or anhydride, and (4) a small quantity of cyclohexanone, toluene or other organic solvent. Thermosetting resins may also be obtained by mixing a water-soluble melamine resin and an alkyd resin from the ester exchange process, the resin being obtained by esterifying a mixture of dehydrated castor oil, an above-mentioned polyhydric alcohol and a small amount of an ester exchanging catalyst such as caustic potash, and thereafter esterifying also an above-mentioned polybasic acid or anhydride. As further known to the skilled person, thermosetting resins consisting of a modified acrylic resin and a water-soluble melamine resin, obtained from hexamethylol melamine hexaalkyl ether, may be obtained by polymerising by heating and stirring a mixture consisting of organic solvents, such as methanol, ethylene glycol, monobutyl ether and/or cyclohexanone, unsaturated acids, such as acrylic acid and/or methacrylic acid, a vinyl monomer (as hereinabove defined), such as styrene and/or acrylic acid ester, a cross-linking vinyl monomer, if necessary, such as methylol, is normally used. Good results may be obtained by using a concentration of resin of from 5 to 20% by weight and by regulating the voltage and the initial current density within a safe and economical range.

As known to the skilled person further resins for use in lacquering metal surfaces are known in the art. As an example, the resin of the lacquer may be selected from the group consisting of cationic epoxy electrocoat, epoxy and polyester resins, and polyester resins. Still further, lacquers adapted for autodeposition coating, such as Autophoretic™ coatings (e.g. Aquence™ Autophoretic® 866™ and BONDERITE® M-PP930™, the latter being an epoxy-acrylic urethane) available from Henkel AG, DE, may also be used in lacquering surfaces comprising iron.

The slide surface 14 may be lacquered by electrocoating involving dipping the slide member into a bath containing the lacquer and applying an electric field to deposit lacquer onto the slide member acting as one of the electrodes. Further, the lacquer may be provided in powder form or in liquid form. Both powder and liquid lacquers may be sprayed onto the slide surface 14 to coat it. For powder lacquers, electro static coating may be used. For liquid lacquers a wet spray application or application in a bath may be used. Further, liquid lacquers in a bath may apart from electrocoating be applied by autodeposition.

In order to provide low friction, the thickness of the lacquer should be as even as possible. Thus it may be preferred to apply the lacquer by an electrocoating process, e.g. anaphoretic coating (cf. the Honny method) or cataphoretic coating, providing very even coatings. There are two types of electrocoating, i.e. anodic and cathodic electrocoating. Whereas the anodic process was the first to be developed commercially, the cathodic process is nowadays more widely used. In the anodic process, a negatively charged material is deposited on the positively charged component constituting the anode. In the cathodic process, positively charged material is deposited on the negatively charged component constituting the cathode. In the art, cathodic electrocoating is also known as cathodic dip painting (CDP), cathodic dip coating, cataphoretic coating, cataphoresis and cathodic electrodeposition. Further, the electrocoating process may also be referred to by the trade names of the bath material used. Examples include Cathoguard (BASF), Cor-Max (Du Pont), Powercron (PPG) and Freiotherm (PPG). Further, also electrostatically coating by powder lacquers or autodeposition in a bath provide even coatings and may thus be used.

In lacquering steel surfaces, autodeposition may be used. As recognized by the skilled person, one of the important steps in autodeposition is the coating bath itself, where water-based paint emulsion at low solids (usually around 4-8% by weight) is combined with two other products. A "starter" solution of acidified ferric ($Fe^{3+}$) fluoride initiates the coating reaction and an oxidizing product stabilizes the metal ions in the solution. The coating emulsion is stable in the presence of ferric ions, but unstable in the presence of ferrous ions ($Fe^{2+}$). Therefore, if ferrous ions are liberated from the metal substrate, localized paint deposition will occur on the surface Immersion of a component made from ferrous metal (e.g. steel) into an autodeposition bath causes the acidic environment to liberate ferrous ions, thereby causing the coating emulsion to be deposited, forming a mono-layer of paint particles. Henkel Adhesive Technologies (US)//Henkel AG & Co. KGaA (Germany) provides coatings under the trademark BONDERITE® for use in autodeposition.

As the lacquer coated on the slide member, e.g. the slide bar 10, typically is more compressible than the material of the slide member, e.g. the slide bar 10, itself, and as load carrying sliding members will apply pressure on the lacquer in sliding over the slide bar 10, the thickness of the lacquer preferably is to be kept thin to reduce compression of it. Compressing the lacquer may negatively affect the sliding resistance; especially at the start of the sliding sequence, i.e. when the sliding member starts to move along the slide bar 10 from a previous state of being at rest.

According to an embodiment, the thickness of the lacquer coated on the slide member, e.g. the slide bar 10, is thus 100 µm or less, preferably 75 µm or less, more preferably 50 µm or less. Further, the thickness of the lacquer coated on the slide member, e.g. the slide bar 10, may be 5 to 75 µm, such as 10 to 50 µm, or 15 to 40 µm. Layers of these thicknesses have been found to provide for efficient sliding behavior, also at the instance when the sliding member starts to move along the slide bar 10.

Not only the low dynamic friction provided by the present slide member, but also the low difference between the static and dynamic friction provided by the present slide member is beneficial in terms of the sliding behavior.

In order to reduce the friction of the slide member, e.g. the slide bar 10, the slide member, e.g. the slide bar 10, is, at least partly, coated with a lipophilic composition coating 18 to provide a slide layer 19. Further, while various components may be present in the lipophilic composition coating 18 present on the lacquer, the composition typically comprises components with intermediate to long carbon chains, e.g. carbon chains having a carbon atom length of C6 or more, such as C8 or more. Thus, the lipophilic composition coating 18 may comprise compounds comprising C6 to C40, such as C8 to C30 or even C10 to C24, non-aromatic hydrocarbyl groups. Typical examples of such non-aromatic hydrocarbyl groups are alkenyl groups and alkyl groups, e.g. alkyl groups. Examples of compounds comprising such non-aromatic hydrocarbyl groups are:

C6 to C40 non-aromatic hydrocarbons, such as alkenes and/or alkanes, e.g. alkanes;
tri-glycerides, e.g. triglycerides comprising C6 to C40, such as C8 to C30, non-aromatic hydrocarbyl groups; and
fatty acids, e.g. C6 to C40, such as C8 to C30, carboxylic acids, and esters thereof, such as alkyl esters of fatty acids, e.g. methyl esters.

As known to the skilled person and as recognized in IUPAC's gold book (International Union of Pure and Applied Chemistry, Compendium of Chemical Terminology—Gold Book, Version 2.3.3 of 2014 Feb. 24):

hydrocarbon denotes compounds consisting of carbon and hydrogen only;
hydrocarbyl denotes univalent groups formed by removing a hydrogen atom from a hydrocarbon;
alkane denotes acyclic branched or unbranched hydrocarbons having the general formula $C_nH_{2n+2}$;
alkene denotes acyclic branched or unbranched hydrocarbons having one or more carbon-carbon double bond(s);
alkyl denotes a univalent group derived from alkanes by removal of a hydrogen atom from any carbon atom —$C_nH_{2n+1}$;
alkenyl denotes an univalent group derived from alkenes by removal of a hydrogen atom from any carbon atom;
fatty acid denotes an aliphatic monocarboxylic acid;
triglyceride denotes an ester of glycerol (propane-1,2,3-triol) with three fatty acids (tri-O-acylglycerol); and
non-aromatic denotes a compound not comprising any cyclically conjugated molecular entity with increased stability due to delocalization.

According to an embodiment, the lipophilic composition coating 18 present on the lacquer comprises at least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % of compounds comprising C6 to C40, such as C8 to C30, alkyl groups. Thus, the lipophilic composition coating 18 may comprise least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % C6 to C40, such as C8 to C30, alkenes and/or alkanes, e.g. alkanes. Further, the lipophilic composition coating 18 present on the lacquer may comprise least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % triglycerides and/or fatty acids (or alkyl esters thereof).

Whereas fatty acids have been found to improve the lubricating effect of mixtures of alkanes, such as liquid paraffin, they are less effective if used on their own. It is thus preferred if the lipophilic composition present on the lacquer is not only composed of fatty acids. The lipophilic composition present on the lacquer may thus comprise less than 99 wt. % fatty acids, such as less than 95 wt. % fatty acids. However, lipophilic compositions essentially only comprising triglycerides, such as coco nut oil, provide very low friction and do thus represent a preferred lipophilic composition present on the lacquer.

According to an embodiment, the lipophilic composition coating 18 present on the lacquer comprises at least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % of alkenes and/or alkanes, e.g. alkanes and 0.1 to 50 wt. %, such as 1 to 40 wt. % or 5 to 30 wt. % triglycerides and/or fatty acids According to another embodiment, the lipophilic composition coating 18 present on the lacquer comprises at least 1 wt. % such as at least 5 wt. %, 10 wt. %, 25 wt. %, 50 wt. %, 60 wt. %, 75 wt. %, 80 wt. % or at least 90 wt. % in total of triglycerides and/or fatty acids and 0.1 to 95 wt. %, such as 1 to 90 wt. % or 5 to 60 wt. % alkenes and/or alkanes, e.g. alkanes.

As already mentioned, typical examples of compounds comprising C6 to C40 non-aromatic hydrocarbyl groups are tri-glycerides and fatty acids. According to an embodiment, the lipophilic composition coating 18 present on the lacquer comprises triglycerides and/or fatty acids. The lipophilic composition coating 18 may thus comprise more than 25 wt. %, e.g. more than 50 wt. %, such as 50 to 100 wt. %, or 75 to 95 wt. %, in total of triglycerides and fatty acids. The triglycerides and/or fatty acids may either be used as the major component in the lipophilic composition coating 18 or as additives.

If to be used as a major component, the lipophilic composition present on the lacquer coating may comprise more than 50 wt. %, such as 50 to 100 wt. %, or 75 to 95 wt. %, triglycerides, e.g. triglycerides to at least 90%. wt composed of a glycerol residue and 3 residues of caproic acid, caprylic acid, capric acid, lauric acid, myristic acid, palmitic acid, stearic acid, and/or arachidic acid, such as 3 residues of lauric acid, myristic acid, palmitic acid, and/or stearic acid. According to an embodiment, the lipophilic composition coating 18 present on the lacquer comprises coconut oil, such as at least 25 wt. % such as at least 50 wt. %, 60 wt. %, 70 wt. %, 75 wt. %, 80 wt. %, 85 wt. % or at least 90 wt. % coconut oil. Coconut oil comprises triglycerides composed of fatty acids that are to a high degree saturated fatty acids. The coconut oil may be hydrogenated to various degrees to further reduce the amount of unsaturated fatty acids residues. Further, the lipophilic composition coating 18 present on the lacquer may comprise more than 50 wt. %, such as 50 to 100 wt. %, or 75 to 95 wt. % fatty acids, e.g. caproic acid, caprylic acid, capric acid, lauric acid, myristic acid, palmitic acid, stearic acid, and/or arachidic acid, such as lauric acid, myristic acid, palmitic acid, and/or stearic acid. Furthermore, the lipophilic composition coating 18 present on the lacquer may comprise more than 50 wt. %, such as 50 to 100 wt. %, or 75 to 95 wt. % alkyl esters of fatty acids, e.g. methyl or ethyl esters. The esterified fatty acids may be caproic acid, caprylic acid, capric acid, lauric acid, myristic acid, palmitic acid, stearic acid, and/or arachidic acid, such as lauric acid, myristic acid, palmitic acid, and/or stearic acid.

If to be used as an additive, the lipophilic composition coating 18 present on the lacquer may comprise 0.1 to 50 wt. %, such as 1 to 30 wt. % or 5 to 15 wt. %, triglycerides, e.g. triglycerides to at least 90% composed of a glycerol residue and 3 residues of caproic acid, caprylic acid, capric acid, lauric acid, myristic acid, palmitic acid, stearic acid, and/or arachidic acid, such as 3 residues of lauric acid, myristic acid, palmitic acid, and/or stearic acid. A preferred example of composition to be used to provide a lipophilic composition coating 18 comprising triglycerides is coconut oil. According to an embodiment, the lipophilic composition coating 18 present on the lacquer comprises coconut oil, such as 0.1 to 50 wt. %, such as 1 to 30 wt. % or 5 to 15 wt. %, coconut oil. According to an embodiment, the lipophilic composition coating 18 present on the lacquer comprises at least 50 wt. % coconut oil, such as at least 60 wt. %, 70 wt.

%, 75 wt. %, 80 wt. %, 85 wt. %, or at least 90 wt. % coconut oil. Coconut oil comprises triglycerides composed of fatty acids that are to a high degree saturated fatty acids. The coconut oil may be hydrogenated to various degrees to further reduce the amount of unsaturated fatty acids residues. Further, the lipophilic composition present on the lacquer may comprise 0.1 to 50 wt. %, such as 1 to 30 wt. % or 5 to 15 wt. %, of fatty acids, e.g. caproic acid, caprylic acid, capric acid, lauric acid, myristic acid, palmitic acid, stearic acid, and/or arachidic acid, such as lauric acid, myristic acid, palmitic acid, and/or stearic acid. Furthermore, the lipophilic composition coating 18 present on the lacquer may comprise 0.1 to 50 wt. %, such as 1 to 30 wt. % or 5 to 15 wt. %, of alkyl esters of fatty acids, e.g. methyl or ethyl esters. The esterified fatty acids may be caproic acid, caprylic acid, capric acid, lauric acid, myristic acid, palmitic acid, stearic acid, and/or arachidic acid, such as lauric acid, myristic acid, palmitic acid, and/or stearic acid.

Both saturated and un-saturated compounds comprising C6 to C40 non-aromatic hydrocarbyl groups are well-known in the art. While both types of compounds will be efficient in reducing the sliding resistance, saturated compounds comprising C6 to C40 non-aromatic hydrocarbyl groups are deemed to be less sensitive to oxidative degradation. Thus, it may be preferred to use compounds comprising C6 to C40 non-aromatic hydrocarbyl groups being triglycerides composed of saturated fatty acids residues and/or saturated fatty acids in the composition. It may however not be necessary to use a 100% saturated fatty acids and/or triglycerides. As example, coconut oil is envisaged to have sufficient long term stability, though saturated fatty acids and/or triglycerides are preferred in terms of their long term stability.

As mentioned, the lipophilic composition coating 18 present on the lacquer may comprises at least 1 wt. % C6 to C40 alkanes. As an example, the lipophilic composition coating 18 present on the lacquer may thus comprise mineral oil, such as at least 1 wt. %, such as at least 5 wt. %, 10 wt. %, 25 wt. %, 50 wt. %, 60 wt. %, 70 wt. %, 75 wt. %, 80 wt. %, 85 wt. %, or at least 90 wt. % mineral oil. Mineral oil is a colorless, odorless, light mixture of higher alkanes from a non-vegetable (mineral) source. Further, the lipophilic composition present on the lacquer coating may comprise liquid paraffin, such as at least 1 wt. %, such as at least 5 wt. %, 10 wt. %, 25 wt. %, 50 wt. %, 60 wt. %, 70 wt. %, 75 wt. %, 80 wt. %, 85 wt. %, or at least 90 wt. % liquid paraffin. Liquid paraffin, also known as paraffinum liquidum, is a very highly refined mineral oil used in cosmetics and for medical purposes. A preferred form is the one having CAS number 8012-95-1. Furthermore, the lipophilic composition coating 18 present on the lacquer may comprise petroleum jelly (also known as petrolatum, white petrolatum, soft paraffin or multi-hydrocarbon), such as at least 1 wt. %, such as at least 5 wt. %, 10 wt. %, 25 wt. %, 50 wt. %, 60 wt. %, 70 wt. %, 75 wt. %, 80 wt. %, 85 wt. %, or at least 90 wt. % petroleum jelly. Petroleum jelly is a semi-solid mixture of hydrocarbons (with carbon numbers mainly higher than 25). A preferred form is the one having CAS number 8009-03-8.

A further embodiment (cf. FIGS. 1 and 3) of the invention relates to sliding system 1, comprising the disclosed slide bar 10 and at least one sliding member 20. The slide bar 10 is typically linear, such as linear aluminium profile. By arranging the interface between slide layer 19 of the slide bar 10 and the sliding member 20 in sliding contact a linear plain bearing is provided. The sliding member 20 is arranged to allow for linear movement of the sliding member in sliding over the slide layer 19 along the longitudinal axis of the linear slide bar 10. Further, the slide bar 10 may be provided with a track, which in this embodiment has the form of a groove 11 extending along the longitudinal axis off the slide bar 1 and defining a slide direction along the longitudinal axis of the slide bar 10. When the slide bar 10 is provided with a groove 11, the slide layer 19 is present at least in the groove 11.

The track, which may for example have the form of a groove, an example of such a groove 11 is illustrated in FIG. 1, or the form of a ridge, improves the control of the lateral position of the sliding member 20 in relation to the slide bar 10 when the sliding member 20 slides along the slide bar 10.

An enlarged detail in FIG. 1 illustrates how the slide member 10, which is made from, in this embodiment, aluminum, has a slide surface 14. The slide surface 14 is coated with the lacquer comprising a resin 16. The lacquer comprising a resin 16 is in turn coated with a lipophilic composition coating 18. Thereby a slide layer 19 is formed. The sliding member 20 may slide over this slide layer 19 at a very low friction.

Further, as shown in FIGS. 2 and 4, the part of the sliding member 20 arranged in contact with the slide layer 19 may be configured as a blade 21 extending in the sliding direction. It was surprisingly found that decreasing the contact area at the interface between the slide bar 10 and the sliding member 20 reduced the friction. Normally the risk for the bearing seizing typically increases with reduced contact area. In order to provide the sliding system 1, the sliding member 20 comprises at least one contact point in contact with the slide bar 10 at the interface between the slide bar 10 and the sliding member 20. According to an embodiment, the contact area of each individual contact point is less than 3 $mm^2$, such as less than 1.5 $mm^2$, or less than 0.75 $mm^2$. The slide member may further be provided with more than one contact point, such as 2, 3, or 4 contact points. If, for example, the sliding member is provided with a blade 21 extending in the sliding direction, then the edge of the blade 21 represents an individual contact point.

It has been found that the friction becomes lower when the contact pressure between the sliding member and the slide bar is relatively high. The contact pressure is calculated by dividing the load carried by each individual contact point by the contact area of the contact point. For example, if the sliding door has a total weight of 8.5 kg this represents a total load of 83.3 N. The sliding door may carried by two sliding members 20 of the design illustrated in FIG. 2. Each sliding member 20 having four contact points, i.e. edges of the blades 21, 22, 23 in FIG. 2, each such contact point having an area of 0.675 $mm^2$. The contact pressure is then: 83.3 N/(2×4×0.675 $mm^2$)=15.4 N/$mm^2$. Preferably, the contact pressure in said at least one contact point is at least 4 N/$mm^2$, more preferably at least 8 N/$mm^2$, such as at least 12 N/$mm^2$. Preferably, the contact pressure is lower than the strain at yield (=yield strength) for the material from which the sliding member 20 is made.

In order to provide low friction, at least the part of the sliding member 20 in contact with the slide layer 19 is preferably made of a plastic comprising a polymer, such as a polymer comprising polar groups. Examples of such polar groups include hydroxyl groups, carboxylic acid groups, amide groups, halide groups, sulfide groups, cyano groups (nitrile groups), carbamate groups, aldehyde groups, and/or ketone groups The polymer may be selected from the group consisting of polyoxymethylenes (POM), polyesters (e.g. thermoplastic polyesters, such as polyethylene terephthalate (PET), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF)), polyamides (PA), polyvinyl chloride (PVC), polyphenylene sulfide (PPS), polyaryletherketone (PAEK; e.g. Polyether ether ketone (PEEK)), and Polytetrafluoroethylene (PTFE). Further, not only the part of the sliding member 20 in contact with the slide layer 19 may be made of a polymer, but the entire sliding member 20. Thus, sliding member may be made from a plastic comprising a polymer. As recognized by the skilled person, the plastic may further comprise other additives, such as fillers, colorants, and/or plasticizers. Further, the sliding member 20 may be made from a composite comprising a polymer, such as one of the above listed polymers, filled with particles and/or fibers. The particles and/or fibers will increase the hardness, the stiffness, the creep resistance and elongation (compression) at yield of the sliding member 20. While not affecting the friction, presence of particles and/or fibers may affect the wear. Thus, use of particles and/or fibers in the plastic is less preferred.

According to an embodiment (cf. FIG. 2) the sliding member 20 may be provided with two parallel, displaced blades 21, 22 in order to prevent rotation along the sliding axis. Further, the slide bar 10 may be provided with two parallel grooves 11, 12 arranged along each side of its longitudinal sliding axis. Parallel grooves 11, 12 will support and guide such two parallel blades 21, 22 of the sliding member (cf. FIG. 1). Further, slide bars with two parallel grooves 11, 11, supporting two separate slide members 20, are preferred in sliding systems arranged to support more than one sliding door (cf. FIG. 3) as only one slide bar is then required. Furthermore, the sliding member 20 may be provided with two, or more, parallel blades 21, 23 (cf. FIGS. 2 and 4) arranged along the same longitudinal axis. The sliding member 20 may be provided with two parallel blades 21, 23 adapted for running in the same groove 11 independently of the presence, or non-presence, of parallel, displaced blades 21, 22 adapted for running in two parallel grooves 11, 12.

The sliding system 1 may be used to support a sliding door 30 connected to the sliding member 20. Thus, the sliding member 20 may be provided with fastening arrangements 28, e.g. holes, pins, etc., for connecting the sliding member 20 to the sliding door 30.

A further embodiment (cf. FIG. 5) of the invention relates to alternative sliding system 1, comprising a linear slide profile 120 and a slide member, the slide member being a sliding part 110 arranged to slide along the longitudinal axis of a linear slide profile 120 to form a linear plain bearing. The interface between the slide layer (similar to the slide layer 19 illustrated in FIG. 1) of the sliding part 110 and the linear slide profile forms a linear plain bearing to allow for linear movement of the sliding part 110 sliding along the longitudinal axis of the linear slide profile 120. According to such an embodiment, the linear slide profile 120 may be a plastic profile provided with at least one ridge 121a-e extending along the longitudinal axis of the profile. The plastic profile may be provided with a sliding channel 125 for the sliding part 110 to slide in. At least one surface of the channel 125 may be provided with a ridge 121a-e extending along the longitudinal axis of the channel 125. As an example, the plastic profile 120 may be U-shaped with at least one of its interior surfaces provided with a ridge extending along the longitudinal axis of the slide bar. The plastic profile 120 may be fitted inside a support member 150, such as a metal rod, to enhance the mechanical strength of the plastic profile. Further, also other surfaces of the channel 125 may be provided with ridge(s) 121a-e extending along the longitudinal axis of the channel. More than one interior side of a U-shaped plastic profile may be provided with a ridge(s) 121a-e extending along the longitudinal axis of the profile 120. The sliding system is arranged in manner such that the slide layer 19 of the sliding part 110 engages with the ridge(s) 121a-e in sliding over the linear slide profile 120. Part of the sliding part 110 may be arranged to fit into the sliding channel 125 and to engage with the ridge(s) 121a-e in sliding within the channel (cf. FIG. 5c). This part may have a cross-section corresponding, in general shape, not size, to the cross-section of the channel excluding the ridge(s) 121a-e. The plastic profile and its ridge(s) 121a-e may then serve to guide the sliding part 110.

As already mentioned, it was surprisingly found that decreasing the contact area at the interface between the two parts of the linear bearing reduces the friction. Normally one would expect the friction to increase with reduced contact area. Further, the risk for the bearing seizing typically increases with reduced contact area. In order to provide the sliding system, the linear slide profile 120 comprises at least one contact point in contact with the sliding part 110 at the interface between the linear slide profile 120 and the sliding part 110. According to an embodiment, the contact area of each individual contact point is less than 3 mm$^2$, such as less than 1.5 mm$^2$, or less than 0.75 mm$^2$. The linear slide profile 120 may further be provided with more than one contact point, such as 2, 3, or 4 contact points. If the linear slide profile is provided with a ridge 121a-e extending in the sliding direction, its edge, or rather that part of the edge which is at a certain instance in contact with the sliding part, represents the contact point.

It has been found that the friction becomes lower when the contact pressure between the sliding part 110 and the linear slide profile bar 120 is relatively high. The contact pressure is calculated by dividing the load carried by each individual contact point by the contact area of the contact point. Preferably, the contact pressure in said at least one contact point is at least 4 N/mm$^2$, more preferably at least 8 N/mm$^2$, such as at least 12 N/mm$^2$. Preferably, the contact pressure is lower than the strain at yield (=yield strength) for the material from which the linear slide profile 120 is made.

Figure 6:
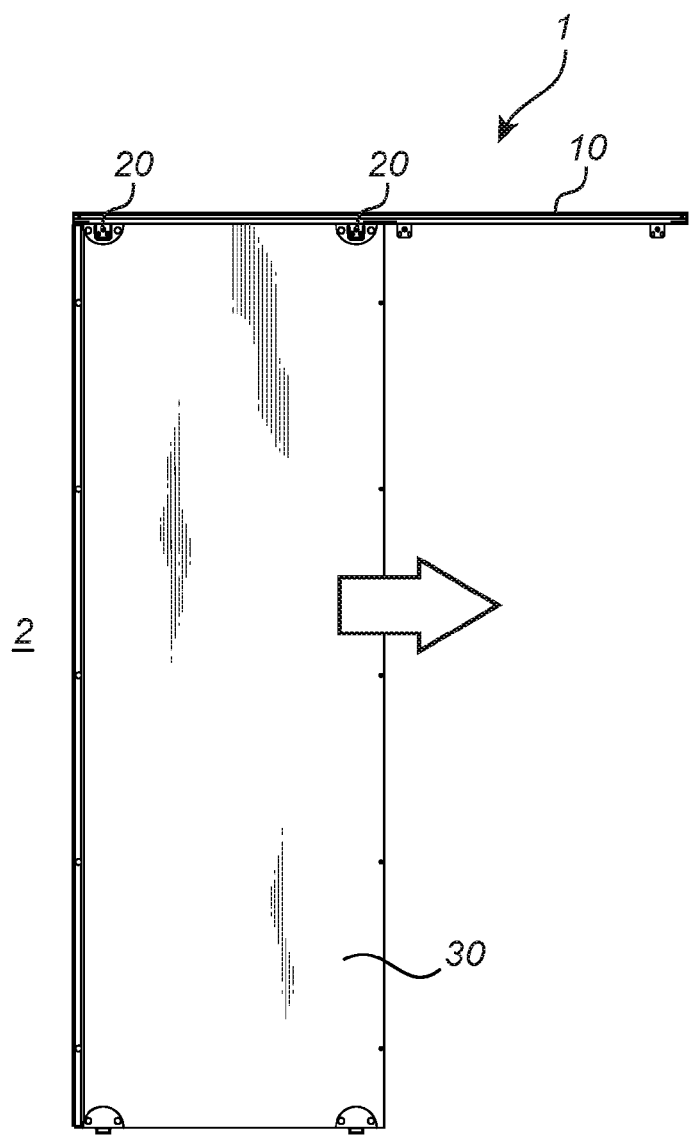
FIG. 6 depicts a schematic sliding door arrangement.

In order to provide low friction, at least the part of the linear slide profile 120 in contact with the slide layer 19 of the sliding part 110 is preferably made of a plastic comprising a polymer, such as a polymer comprising polar groups. Examples of such polar groups include hydroxyl groups, carboxylic acid groups, amide groups, halide groups, sulfide groups, cyano groups (nitrile groups), carbamate groups, aldehyde groups, and/or ketone groups The polymer may be selected from the group consisting of polyoxymethylenes (POM), polyesters (e.g. thermoplastic polyesters, such as polyethylene terephthalate (PET), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF)), polyamides (PA), polyvinyl chloride (PVC), polyphenylene sulfide (PPS), polyaryletherketone (PAEK; e.g. Polyether ether ketone (PEEK)), and Polytetrafluoroethylene (PTFE). According to one embodiment not only the part of the linear slide profile 120 in contact with the slide layer 19 is made of a polymer, but the entire linear slide profile 120 is made of a polymer. Thus, linear slide profile 120 may in its entirety be made from a plastic comprising a polymer. As recognized by the skilled person, the plastic may further comprise other additives, such fillers, colorants, and/or plasticizers. Further, the linear slide profile 120 may made from a composite comprising a polymer, such as one of the above listed polymers, filled with particles and/or fibers. The particles and/or fibers will increase the hardness, the stiffness, the creep resistance and elongation (compression) at yield of the linear slide profile. While not affecting the friction, presence of particles and/or fibers may still affect the wear. Thus, use of particles and/or fibers in the plastic is less preferred. A further embodiment of the invention relates to a sliding door arrangement 2, schematically depicted in FIG. 6, such as a sliding door arrangement for a wardrobe. Such an arrangement 2 comprises the disclosed sliding system 1 and a sliding door 30. One, or often two or three, sliding member/-s 20 is/are arranged to support the sliding door 30 to allow for linear movement of the sliding door 30 along the longitudinal axis of the linear slide bar 10. Typically the sliding door 30 is connected to the sliding member 20 supporting the door. The slide bar 10 may be horizontally arranged in use with the slide layer 19 facing upwards to support the sliding member 20. As the sliding member 20 may be arranged to horizontally slide over the slide bar 10, the sliding door 30 may be moved along the horizontal axis of the linear slide bar 1. The sliding door, such as a sliding door 30 for a wardrobe, will typically be arranged hanging from the linear slide bar 10.

A sliding door 30 may however also be mounted standing on the linear slide bar 10. Smaller doors, such as kitchen cabinet doors, are examples of doors which may be standing on the linear slide bar 10. Further, sliding doors 30 mounted standing on the linear slide bar 10, may not necessarily extend in the vertical plane, but may be slightly tilted with respect to the vertical plane, as is known for kitchen cabinet doors. However, given the low friction provided by the present sliding system, also larger doors may be mounted standing on the linear slide bar 10.

Furthermore there is, according to an embodiment, provided a method for providing slide member. In such a method there is provided a member having a slide surface 14 coated with a lacquer comprising a resin 16. In order to provide the member with lowered friction, the lacquer is, at least partly, coated with a lipophilic composition coating 18. Aspects of the member, the lacquer, and the lipophilic composition coating 18 have been provided herein above and are applicable to this embodiment as well. In applying the lipophilic composition to provide the lipophilic composition coating 18, the lipophilic composition may firstly be heated, such as melted, to reduce its viscosity. Further, the lipophilic composition may be dissolved in a solvent to facilitate application. Lipophilic composition being in a liquid state at room temperature may also be applied directly. After application, any such solvent may be evaporated, at least partly. The lipophilic composition to provide the lipophilic composition coating 18 may be applied in various ways, such as by spraying, smearing, painting, coating, spreading etc.

According to an embodiment, the lipophilic composition is applied by the end-consumer. Thus, the slide member, the sliding system or arrangements comprising the slide member may be provided together with a lipophilic composition to be applied by the end-consumer, i.e. the lacquer is un-coated upon delivery.

Similarly, another embodiment relates to the use of such a lipophilic composition as an irreversibly bound lubricant for a slide surface 14 of a slide member. By "irreversibly bound lubricant" is, according to an embodiment, meant that the lubricant is not removed from the slide surface 14 during normal operation of the sliding system and that it cannot be easily removed using mechanical means, e.g. it cannot be removed by wiping the slide surface 14 with a cloth. As described herein, the slide surface of the slide member is coated with a lacquer comprising a resin 16. Aspects of the member, the lacquer, and the lipophilic composition coating 18 have been provided herein above and are applicable to this embodiment as well.

As described previously a sliding system according to the principles set forth in this specification may also be used for extendable beds, extendable bed frames, sofa beds, drawers, tables, etc. An embodiment of an extendable bed/bed frame sliding system 1001 for an extendable bed or bed frame is shown in FIGS. 9a-12, whereby the individual parts are disclosed in detail. The sliding system 1001 allows for a full extension of a moving part of an extendable bed or extendable bed frame, meaning that the moveable part may be drawn out from a fixed frame structure. The moveable part may e.g. be a foot end of the extendable bed or extendable bed frame, while the fixed frame structure may be the head end.

The sliding system 1001 comprises a first guiding rail 1100, which is best shown in FIGS. 9a-9b, comprising securing means 1120, here in the form of two spaced apart through holes, for securely attaching the first guiding rail 1100 to the inner wall of a fixed frame structure, such as to the head end of the extendable bed or bed frame. Horizontal mounting of the first guiding rail 1100 is preferred. The first guiding rail 1100 has a C-shape, better shown in FIG. 9b, and is provided with two or more sets of sliding members 1200 that are all mounted inside the C-shape of the guiding rail 1100. Two sliding members 1200 are fixedly mounted to the upper part of the C-shape, and two sliding members 1200 are fixedly mounted to the bottom part of the C-shape. The sliding members 1200 are arranged in pairs, such that an upper sliding member 1200 and a lower sliding member 1200 are aligned in a vertical direction. The sliding members 1200 are thus stationary relative the fixed frame structure when the first guiding rail 1100 is mounted to the fixed frame structure. The sliding members 1200 may be made of polymer materials according to the principles described hereinbefore.

Now turning to FIGS. 10a-b the sliding system 1001 also comprises a slide member which in this embodiment is an intermediate guiding rail in the form of an intermediate slide bar 1300. The intermediate slide bar 1300 is configured as a C-shape and has an upper and outer slide surface 1320, an upper and inner slide surface 1340, a bottom and inner slide surface 1360, and a bottom and outer slide surface 1380, as best shown in FIG. 10b. These slide surfaces 1320, 1340, 1360, 1380 are preferably planar, and the width of the outer slide surfaces 1320, 1380 is dimensioned to engage with the sliding members 1200 of the first guiding rail 1100. The slide surfaces 1320, 1230, 1360, 1380 may be formed according to the principles described hereinbefore, similar to the slide surface 14, and are provided with a lacquer comprising a resin and a lipophilic composition coating to form respective slide layers which may be similar to the slide layer 19 described hereinbefore, see for example FIG. 1 and the related description.

The intermediate slide bar 1300 is thus configured to be received by the C-shaped first guiding rail 1100.

The sliding system 1001 also comprises a second guiding rail 1400 to be fixedly mounted to a moveable part, e.g. the foot end, of the extendable bed or extendable bed frame. The second guiding rail 1400 is provided with means (not shown), such as screw holes or similar, for attaching the second guiding rail 1400 to the moveable part. As can be seen in FIGS. 11a-b the second guiding rail 1400 is L-shaped, whereby the lower part 1420 can be used for aligning with the bottom end of the moveable part. Hence the moveable part of the extendable bed or bed frame may rest on the lower part 1420, while the side wall of the moveable part is screwed to the vertical part 1440 of the second guiding rail 1400.

The second guiding rail 1400 is provided with one or more sliding members 1500 protruding outwards for engagement with the inner slide surfaces 1340, 1360 of the intermediate slide bar 1300. In this embodiment there are two separate sliding members 1500 attached to the vertical part 1440 of each second guiding rail 1400. The vertical height of the sliding members 1500 thus corresponds to the distance between the two inner slide surfaces 1340, 1360 of the intermediate slide bar 1300. The sliding members 1500 may be made of polymer materials according to the principles described hereinbefore.

Figure 12:
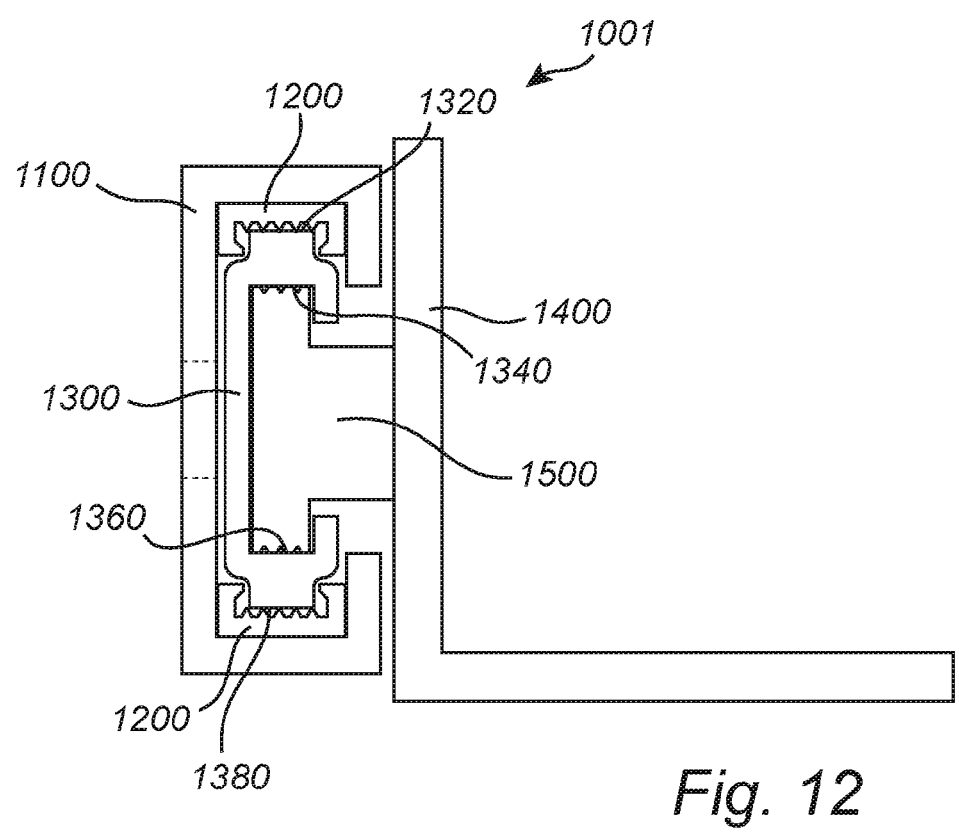
FIG. 12 is a cross-sectional view of the extendable bed or an extendable bed frame sliding system shown in an assembled state.

FIG. 12 illustrates a cross-sectional view of the sliding system 1001 in an assembled state. Two sliding interfaces are thus provided, the first one being realized by the sliding engagement between the sliding members 1200 of the first guiding rail 1100 and the outer slide surfaces 1320, 1380 of the intermediate slide bar 1300. The second sliding interface is realized by the sliding engagement between the inner slide surfaces 1340, 1360 of the intermediate slide bar 1300 and the sliding members 1500 of the second guiding rail 1400. The sliding interfaces may include protrusions, e.g., blades, and grooves according to principles described hereinabove, see for example FIG. 1.

While the embodiment of FIGS. 9a to 12 is described as an extendable bed and/or extendable bed frame sliding system 1001 for an extendable bed or extendable bed frame it will be appreciated that the slide member and the sliding system 1001 according to the described principles may be useful also in other applications, in particular applications where a moveable part is to be drawn out from a fixed part, including e.g. extendable tables, drawers to be drawn out of chests of drawers, etc.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and other embodiments than those specifically described above are equally possible within the scope of these appended claims, e.g. different embodiments than those described above.

In the claims, the term "comprises/comprising" does not exclude the presence of other elements or steps. Additionally, although individual features may be included in different claims, these may possibly advantageously be combined, and the inclusion of two features in different claims does not imply that a combination of those features is not feasible and/or advantageous.

In addition, singular references do not exclude a plurality. The terms "a", "an", "first", "second" etc. do not preclude a plurality.

EXAMPLES

The following examples are mere examples and should by no means be interpreted to limit the scope of the invention, as the invention is limited only by the accompanying claims.

General

All chemicals were obtained from Sigma-Aldrich. In providing mixtures, e.g. palmitic acid 10 mass % in liquid paraffin, the two compounds (e.g. 3 g palmitic acid and 27 g liquid paraffin) were mixed under heating to melt the mixture. Further, the mixtures were applied to the slide bar before solidifying.

Figure 7:
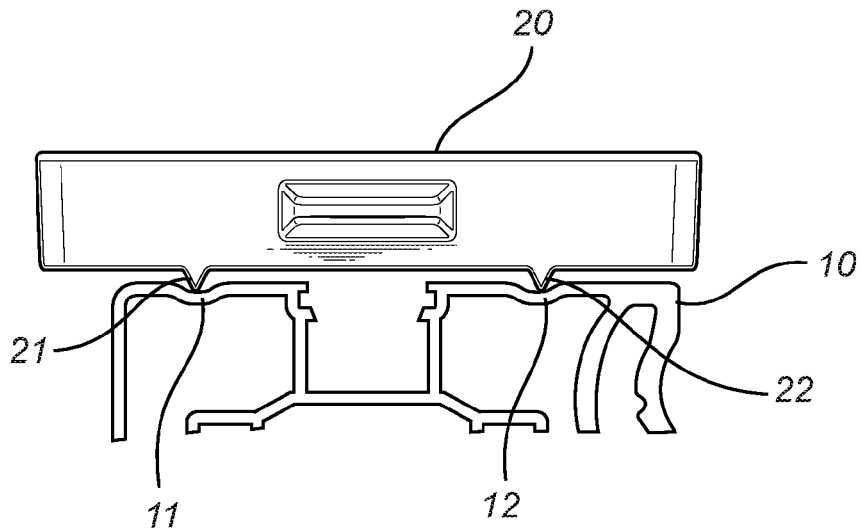
FIG. 7 depicts a cross section of a sliding system used for friction tests.
Figure 8:
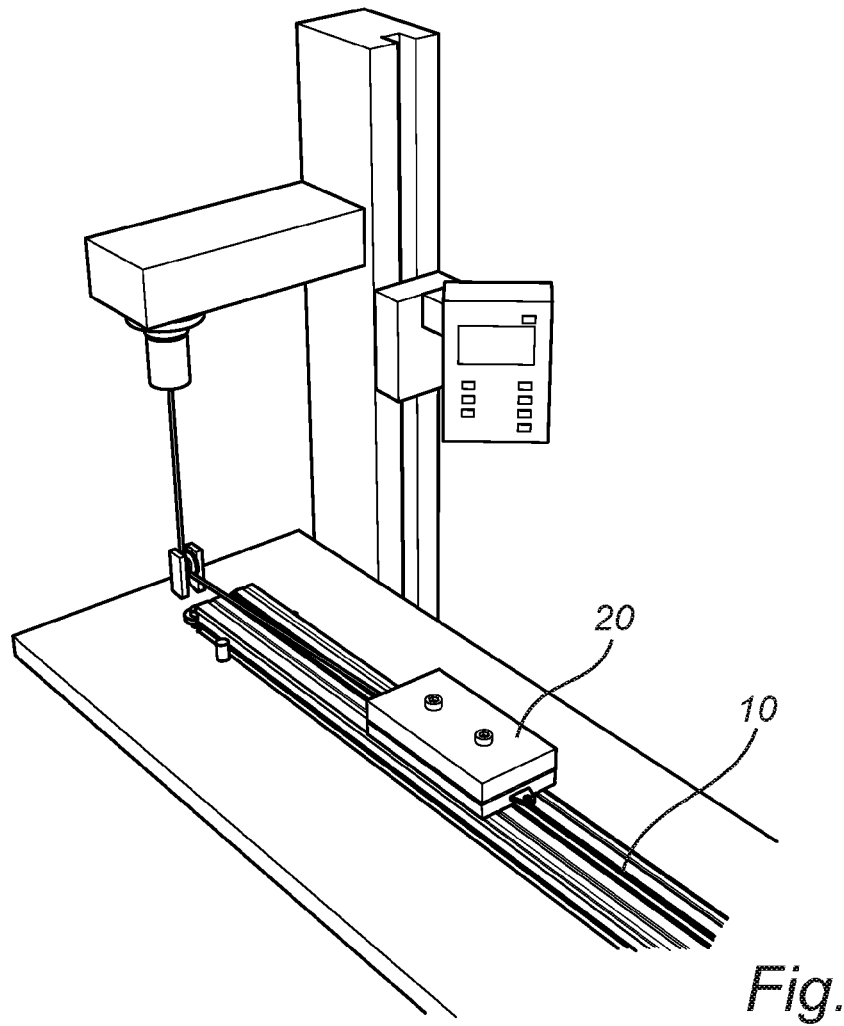
FIG. 8 illustrates an arrangement for performing friction tests with the sliding system of FIG. 7.

The test procedure used was based on SS-EN 14882:205. In short, a sled with parallel plastic blades (four in total; two along each longitudinal slide axis) of POM was positioned on an anodized aluminum profile (cf. FIG. 7) having been anaphoretically coated with an acrylic resin and subsequently heat cured to provide a lacquered slide surface. Aluminum profiles lacquered in this way are for example provided by Sapa Profiler AB, 574 38 Vetlanda, Sweden, and are marketed under the trade name SAPA HM-white, the materials being produced using the Sapa HM-white method which is based on the above referenced Honny method. In the friction measurements, the sled was pulled over the slide bar at a constant speed of 500 mm/min and the force necessary to pull the sled was registered using an Instron 5966 tension testing system (cf. FIG. 8). The total weight of the sled corresponds to 10 N. Fresh profiles were used for each lipophilic composition, as the lipophilic compositions cannot be removed once applied. However, the profiles were re-used after the control experiments (no lipophilic compositions applied), washing and ageing, respectively.

Example 1

By using the test procedure described above, the resulting friction from application of various lipophilic compositions to anodized, lacquered aluminum profiles was determined. The resulting dynamic friction, mean value from three test sequences, was registered and compared to the dynamic friction for anodized aluminum profiles provided with a lacquer but not coated with any lipophilic composition (=control). The results are provided in Table 1 and 2 below.

TABLE 1

| Fatty acids in liquid paraffin | | | |
| --- | --- | --- | --- |
| Lipophilic composition | Wash | Ageing | Dynamic friction Mean (n = 3) |
| No (control) | — | — | 0.214 |
| MA5% | — | — | 0.049 |
| MA10% | — | 3 days | 0.046 |
| MA30% | — | — | 0.049 |
| MA10% | Yes | — | 0.041 |
| PA10% | — | 3 days | 0.047 |
| PA10% | Yes | — | 0.042 |
| SA10% | — | 3 days | 0.050 |
| SA10% | Yes | — | 0.044 |
| LP | — | — | 0.053 |
| LP | Yes | — | 0.050 |

MA5%/10%/30% = Myristic acid 5/10/30 mass % in liquid paraffin
PA10% = Palmitic acid 10 mass % in liquid paraffin
SA10% = Stearic acid 10 mass % in liquid paraffin
LP = Liquid paraffin

TABLE 2

Triglycerides in liquid paraffin

| Lipophilic composition | Wash | Ageing | Dynamic friction Mean (n = 3) |
|---|---|---|---|
| No (control) | — | — | 0.214 |
| TM10% | — | — | 0.0510 |
| TM10% | Yes | — | 0.0524 |
| TP10% | — | 3 days | 0.0454 |
| TP10% | — | 6 weeks | 0.0513 |
| TP10% | Yes | — | 0.0440 |
| TS10% | — | — | 0.0524 |
| TS10% | Yes | — | 0.0504 |
| LP | — | — | 0.053 |
| LP | Yes | — | 0.050 |

TM10% = Trimyristate 10 mass % in Liquid paraffin
TP10% = Tripalmitate 10 mass % in Liquid paraffin
TS10% = Tristearate 10 mass % in Liquid paraffin
LP = Liquid paraffin

TABLE 3

Fatty acids in liquid paraffin

| Lipophilic composition | Wash | Dynamic friction Mean (n = 3) |
|---|---|---|
| LP | — | 0.054 |
| LP | Yes | 0.042 |
| LA10% | — | 0.058 |
| LA 10% | Yes | 0.041 |
| LA 30% | — | 0.046 |
| LA 30% | Yes | 0.039 |
| LA 50% | — | 0.048 |
| LA 50% | Yes | 0.036 |
| LA 70% | — | 0.041 |
| LA 70% | Yes | 0.036 |
| Coconut oil | — | 0.033 |
| Coconut oil | Yes | 0.037 |

LA10/30/50/70% = Lauric acid 10/30/50/70 mass % in Liquid paraffin

As can be seen from Table 1 and 2, the resulting dynamic friction was reduced by about 75% by applying a lipophilic compositions to the anodized aluminum profiles, though the initial dynamic friction of the un-coated anodized aluminum profiles was not that high. Furthermore, whereas the dynamic friction remained low and nearly the same for the coated profiles over repeated cycles, the dynamic friction for un-coated anodized aluminum profiles was significantly increased (seizing) already after less than 20 test cycles.

It can also be seen from the above tables 1 and 2 that the tests including fatty acids or triglycerides resulted in a somewhat lower friction compared to pure Liquid paraffin, in particular when the fatty acid is myristic acid or palmitic acid, and when the triglyceride is tripalmitate. Coconut oil, being a mixture of various triglycerides, in which lauric acid is the most common fatty acid residue, provided very low friction (cf. Table 3). Further, neither ageing nor washing (wiping by a wet cloth 6 times, followed by wiping 4 times with a dry cloth) had any significant effect on the dynamic friction.

Example 2

By using the test procedure described above, the resulting friction at various loads (5, 10 and 20 N, respectively) using liquid paraffin as the lipophilic composition coating was determined. Increasing the load did not result in increased friction. On the contrary, the lowest load (5 N) displayed the highest friction (friction value 0.052 (at 5 N) vs. friction values 0.045 (at 10 N)/0.046 (at 20 N)).

Example 3

In an additional experiment, a corresponding aluminum bar, but without any lacquer, was used. Use of palmitic acid 10 mass % in liquid paraffin as lubricant on the non-lacquered bar resulted in a dynamic friction of 0.1132, i.e. more than 100% higher than corresponding dynamic friction obtained with the lacquered aluminum bar (cf. Table 1; 0.042 and 0.047, respectively).

Example 4

In additional examples also steel profiles as well as other lacquers were evaluated.

Lacquers: Teknotherm 4400 (Teknos)—wet spray lacquer, Standofleet® (Standox) wet spray lacquer, Powercron® 6200HE (PPG)—cationic epoxy electrocoat, Interpon AF (AkzoNobel)—powder coating, and Alesta (Axalta)—powder coating.

Profiles: Aluminium (Al), and steel (Fe)

TABLE 4

Coconut oil on aluminum and steel profiles

| Lacquer | Profile | Dynamic friction Mean (n = 3) | Profile | Dynamic friction Mean (n = 3) |
|---|---|---|---|---|
| Teknotherm | Al | 0.040 | Fe | 0.050 |
| Standofleet | Al | 0.045 | Fe | 0.048 |
| Interpon AF | Al | 0.024 | Fe | 0.034 |
| Powercron | Al | 0.021 | Fe | 0.041 |
| Alesta | Al | 0.025 | Fe | 0.038 |

As can be seen from Table 4, the aluminum profiles displayed lower friction than the steel profiles though also the steel profiles displayed a very low friction. Further, whereas some of the alternative lacquers displayed comparable or lower friction than the SAPA HM-white profiles (dynamic friction mean: 0.033), the wet lacquered profiles displayed slightly higher friction. Without being bond to any theory, this may be due to wet lacquered profiles inherently having somewhat thicker lacquer and/or varying thickness of the lacquer. Further, in comparing coconut oil and liquid paraffin (data not shown) it was seen that coconut oil generally provided somewhat lower friction.

Example 5

Tests were also performed in a full-scale test rig using a wardrobe door with a weight of 8.5 kg and using two sliding members 20 and a slide bar 10 of the type described hereinabove with reference to FIG. 1. When applying a lipophilic composition coating comprising 100% Liquid paraffin to the lacquer of the slide bar 10 the wardrobe door could still be moved back and forth without problems and at still a low friction after 500 000 cycles of reciprocation of the wardrobe door. In a comparative test the same equipment was used, but without any lipophilic composition coating being applied on the lacquer. In the latter case the tests had to be stopped already after less than 30 cycles as the test equipment was about to break down due to rapidly increasing friction between the sliding members and the slide bar (seizing).

The invention claimed is:
1. A sliding system, said sliding system comprising a slide member having a slide surface at least partly coated with a lipophilic composition coating to provide a slide layer with lowered friction, and at least one sliding member, wherein the interface between the slide layer of the slide member and the sliding member forms a bearing to allow for movement of the sliding member along the slide member, wherein at least the part of said sliding member being in contact with the slide layer of the slide member is made of a plastic, and wherein the sliding member comprises at least one individual contact point in contact with the slide member at the interface between the slide member and the sliding member, the contact area of each individual contact point being less than 3 mm².

2. The sliding system according to claim 1, wherein the slide member is a slide bar forming a linear slide profile, wherein the interface between the slide layer of the slide bar and the at least one sliding member forms a linear plain bearing to allow for linear movement of the at least one sliding member along the longitudinal axis of the slide bar.

3. The sliding system according to claim 1, wherein the slide member is made from a material having a Vickers hardness of at least 50 MPa; and/or wherein the slide member is made of aluminum and/or steel.

4. The sliding system according to claim 1, wherein the slide surface is coated with a lacquer comprising a resin and wherein said lacquer in turn is at least partly coated with the lipophilic composition coating.

5. The sliding system according to claim 4, wherein the slide member is a linear aluminum profile, having an anodized oxide surface layer onto which the lacquer is applied, the thickness of the anodized oxide surface layer being at least 5 micrometers.

6. The sliding system according to claim 4, wherein the resin of the lacquer is a thermosetting resin.

7. The slide member according to claim 4, wherein the slide surface has been lacquered by electro coating or autodeposition in a bath containing the lacquer, or by electrostatic coating with the lacquer that is a powder.

8. The slide member according to claim 4, wherein the thickness of the lacquer coated on the slide member is 5 to 75 μm.

9. The sliding system according to claim 4, wherein the slide member is an aluminum member, having an anodized oxide surface layer onto which the lacquer is applied, and wherein the surface of the aluminum member has been electrophoretically coated with a resin and subsequently heat cured to form the lacquer coated on the slide surface.

10. The sliding system according to claim 1, wherein the lipophilic composition coating comprises compounds comprising C6 to C40 non-aromatic hydrocarbyl groups.

11. The sliding system according to claim 10, wherein the lipophilic composition coating comprises at least 25 wt. % of compounds comprising C6 to C40 alkyl groups.

12. The sliding system according to claim 10, wherein the lipophilic composition coating comprises at least 25 wt. % C6 to C40 non-aromatic hydrocarbons, and wherein the lipophilic composition coating comprises triglycerides and/or fatty acids.

13. The sliding system according to claim 1, wherein the lipophilic composition coating comprises 1 to 40 wt. % triglycerides and/or fatty acids; or wherein the lipophilic composition coating comprises at least 25 wt. % of triglycerides and/or fatty acids.

14. The sliding system according to claim 1, wherein at least the part of said sliding member in contact with the slide layer of the slide member is made of a plastic comprising a polymer selected from the group of polymers consisting of polyoxymethylenes (POM), polyesters, polyamides (PA), polyvinyl chloride (PVC), polyphenylene sulfide (PPS), polyaryletherketone (PAEK), and Polytetrafluoroethylene (PTFE).

15. The sliding system according to claim 1, wherein said sliding member is in its entirety made from a plastic.

16. The sliding system according to claim 1, wherein the part of said sliding member to slide over the slide layer is configured as a blade extending in the sliding direction.

17. The sliding system according to claim 1, wherein the part of said sliding member to slide over the slide layer is configured as a blade extending in the sliding direction, the slide layer being present in a groove.

18. A sliding system, said system comprising a slide member having a slide surface at least partly coated with a lipophilic composition coating to provide a slide layer with lowered friction, and at least one slide profile, wherein said slide member is a sliding part arranged to slide along the slide profile, wherein at least the part of the slide profile being in contact with the slide layer of the sliding part is made of a plastic, wherein the interface between the slide layer of the sliding part and the slide profile forms a bearing to allow for movement of the sliding part along the slide profile, and wherein the slide profile comprises at least one individual contact point in contact with the sliding part at the interface between the slide profile and the sliding part, the contact area of each individual contact point being less than 3 mm².

19. The sliding system according to claim 1, wherein the part of said sliding member to slide over the slide layer is configured as a blade extending in the sliding direction, the slide layer being present in a groove or at a planar surface.

20. A sliding system, said sliding system comprising a slide member having a slide surface at least partly coated with a lipophilic composition coating to provide a slide layer with lowered friction, and at least one sliding member, wherein the interface between the slide layer of the slide member and the sliding member forms a bearing to allow for movement of the sliding member along the slide member, wherein at least the part of said sliding member being in contact with the slide layer of the slide member is made of a plastic, wherein the lipophilic composition coating comprises at least 25 wt. % C6 to C40 non-aromatic hydrocarbons, and wherein the lipophilic composition coating comprises triglycerides and/or fatty acids; and/or wherein the lipophilic composition coating comprises 1 to 40 wt. % triglycerides and/or fatty acids.

21. A sliding system, said system comprising a slide member having a slide surface at least partly coated with a lipophilic composition coating to provide a slide layer with lowered friction, and at least one slide profile, wherein said slide member is a sliding part arranged to slide along the slide profile, wherein at least the part of the slide profile being in contact with the slide layer of the sliding part is made of a plastic, wherein the interface between the slide layer of the sliding part and the slide profile forms a bearing to allow for movement of the sliding part along the slide profile, wherein the lipophilic composition coating comprises at least 25 wt. % C6 to C40 non-aromatic hydrocarbons, and wherein the lipophilic composition coating comprises triglycerides and/or fatty acids; and/or wherein the lipophilic composition coating comprises 1 to 40 wt. % triglycerides and/or fatty acids.

* * * * *

(12) SUPPLEMENTAL EXAMINATION CERTIFICATE

United States Patent
Andersson

(10) Number: US 12,098,747 F1
(45) Certificate Issued: Nov. 19, 2024

Control No.: 96/050,058

Filing Date: Nov. 25, 2024

Primary Examiner: William E Dondero

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 3,615,144 | 10/26/1971 | Plemeng |
| 3,047,934 | 08/07/1962 | Magner et al. |
| 3,457,676 | 07/29/1969 | Ziegler |
| 3,457,677 | 07/29/1969 | Ziegler |
| 4,455,709 | 06/26/1984 | Zanini |
| 4,833,848 | 05/30/1989 | Guerin |
| 4,868,935 | 09/26/1989 | Van Weelden |
| 5,992,496 | 11/30/1999 | Lee |